United States Patent
Kawachi et al.

(10) Patent No.: US 6,183,863 B1
(45) Date of Patent: *Feb. 6, 2001

(54) ADHESIVE ETHYLENE COPOLYMER RESIN COMPOSITIONS AND LAMINATES USING THE SAME

(75) Inventors: Hideshi Kawachi; Yuji Sawada; Haruhiko Tanaka, all of Ichihara (JP)

(73) Assignee: Mitsui Chemical Inc, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/836,316

(22) PCT Filed: Sep. 9, 1996

(86) PCT No.: PCT/JP96/02560

§ 371 Date: May 12, 1997

§ 102(e) Date: May 12, 1997

(87) PCT Pub. No.: WO97/10297

PCT Pub. Date: Mar. 20, 1997

(30) Foreign Application Priority Data

| Sep. 12, 1995 | (JP) | 7-234345 |
| Sep. 12, 1995 | (JP) | 7-234346 |
| Sep. 26, 1995 | (JP) | 7-247614 |

(51) Int. Cl.$^7$ .................................................. B32B 27/32
(52) U.S. Cl. ........................... 428/355 AC; 428/461; 428/475.8; 428/483; 428/515; 428/520; 525/70; 525/78; 525/246
(58) Field of Search .................. 525/64, 67, 78, 525/70, 74, 240, 324, 80; 526/352.2; 428/355 AC, 461, 483, 475.8, 520, 515

(56) References Cited

U.S. PATENT DOCUMENTS

| 4,557,780 | * | 12/1985 | Newsome et al. | 156/244.11 |
| 4,576,995 | * | 3/1986 | Nakabayashi et al. | 525/285 |
| 4,927,690 | * | 5/1990 | Welsh | 428/35.7 |
| 5,278,272 | * | 1/1994 | Lai et al. | 526/348.5 |
| 5,705,565 | * | 1/1998 | Hughes et al. | 525/65 |

FOREIGN PATENT DOCUMENTS

| 61-241144 | 10/1986 | (CN) . |
| 2029331 | 1/1990 | (JP) . |
| 2276807 | 11/1990 | (JP) . |

* cited by examiner

Primary Examiner—Paul Thibodeau
Assistant Examiner—D. Lawrence Tarazano

(57) ABSTRACT

An adhesive ethylene copolymer resin composition blend of a modified ethylene/α-olefin copolymer obtained by graft-modifying an unmodified linear ethylene/α-olefin copolymer comprising ethylene and an a-olefin of 3 to 20 carbon atoms with an unsaturated carboxylic acid or its derivative, or the unmodified ethylene/α-olefin copolymer and the modified ethylene/α-olefin copolymer and an olefin elastomer (F) The linear ethylene/α-olefin copolymer being prepared by the use of an olefin polymerization catalyst including a Group IV transition metal compound (a) containing a ligand having cyclopentadienyl skeleton and an organoaluminum oxy-compound (b). The adhesive ethylene copolymer resin composition can be used as a layer to form a laminate with a layer of a polar material or a layer of a metal. The polar material layer can be a layer of an ethylene/vinyl alcohol copolymer, a layer of a polyamide or a layer of a polyester.

5 Claims, No Drawings

ADHESIVE ETHYLENE COPOLYMER RESIN COMPOSITIONS AND LAMINATES USING THE SAME

TECHNICAL FIELD

The present invention relates to adhesive ethylene copolymer resin compositions and laminates using the compositions. More particularly, the invention relates adhesive ethylene copolymer resin compositions capable of being laminated with various resins such as polystyrene resins, ABS resin, polyacrylonitrile resins, polyester resins, polycarbonate resins, polyvinylidene chloride resins and ethylene/vinyl acetate copolymer saponified resins (EVOH) in a molten state to form laminates showing better retention of adhesion in an atmosphere of high temperatures than the conventional graft-modified low-crystalline ethylene polymers, and relates to laminates using the compositions. Further, the invention also relates to adhesive ethylene copolymer resin compositions exhibiting excellent adhesive strength particularly to metals and polar materials such as ethylene/vinyl alcohol copolymers, polyamides and polyesters, and to laminates using the compositions.

BACKGROUND ART

Because of their excellent properties, ethylene copolymers have been molded by various methods and applied to various uses. However, the ethylene copolymers have poor affinity for metals and various polar materials, because they have no polar group in their molecules, that is, they are non-polar resins. Therefore, when the ethylene copolymers are applied to uses where they must be bonded to metals or blended with polar resins, some improvement should be made. In order to improve their affinity for the polar materials, for example, a method of graft-modifying the ethylene copolymers with polar monomers is known.

However, even the graft-modified ethylene copolymers show insufficient adhesive strength to polystyrene resins, ABS resin, polyacrylonitrile resins, polyester resins, polycarbonate resins, polyvinylidene chloride resins, etc.

In this connection, Japanese Patent Laid-Open Publication No. 241144/1986 describes that a composition comprising a low-density ethylene/α-olefin copolymer having been partially or wholly graft-modified with an unsaturated carboxylic acid or its derivative and a tackifier shows good adhesive strength to styrene resins.

Japanese Patent Laid-Open Publications No. 045445/1989 and No. 029331/1990 describe that an adhesive resin composition comprising a low-density ethylene/α-olefin copolymer, an ethylene/vinyl acetate copolymer and polyethylene having been partially or wholly graft-modified with an unsaturated carboxylic acid or its derivative shows good adhesive strength to polyester resins, polycarbonate resins, polyvinylidene chloride resins, etc.

However, the low-density ethylene/α-olefin copolymers shown in these publications sometimes exhibit insufficient adhesive strength in an atmosphere of high temperatures.

Accordingly, if adhesive ethylene copolymer resin compositions, which have good adhesive strength to polystyrene resins, ABS resin, polyacrylonitrile resins, polyester resins, polycarbonate resins, polyvinylidene chloride resins, etc. and are hardly decreased in the adhesive strength even in an atmosphere of high temperatures, are developed, their industrial value will be extremely high.

The ethylene copolymers are required to have different properties according to the molding method or use purpose. For example, in the high-speed production of inflation films, an ethylene copolymer having a high melt tension for the molecular weight must be selected to conduct stable high-speed molding without suffering instability of bubbles or break of bubbles. The similar properties are required to prevent sagging or break of resin in the hollow molding or to restrain neck-in to a minimum in the T-die molding. In the extrusion molding, further, the ethylene copolymer is required to have a small stress in a high-shear state from the viewpoints of improvement in qualities of molded products and economical efficiency such as reduction of power consumption in the molding process.

Meanwhile, a method of improving a melt tension or a swell ratio (die swell ratio) of the ethylene polymers obtained by the use of Ziegler catalysts, particularly titanium catalysts, to thereby improve moldability is proposed in Japanese Patent Laid-Open Publications No. 90810/1981 and No. 106806/1985. However, the ethylene polymers, specifically low-density ethylene polymers, obtained by the use of the titanium catalysts generally have problems of wide composition distribution and surface tackiness of their molded products such as films.

Of the ethylene polymers prepared by the use of Ziegler catalysts, those prepared by the use of chromium catalysts have relatively good melt tension but has a problem of poor heat stability. The reason is presumably that the ends of chain molecules of the ethylene polymers prepared by the use of the chromium catalysts easily become unsaturated bonds.

The ethylene polymers obtained by the use of metallocene catalysts among the Ziegler catalysts are known to have advantages such as narrow composition distribution and low surface tackiness of their molded products such as films. In Japanese Patent Laid-Open Publication No. 35007/1985, however, it is described that the ethylene polymers obtained by using, as catalysts, zirconocene compounds composed of cyclopentadiene derivatives contain one terminal unsaturated bond per one molecule, and therefore it is thought that they have bad heat stability, similarly to the ethylene polymers obtained by the use of the chromium catalysts. Additionally, there is a fear of bad flowability in the extrusion molding process because these ethylene polymers have narrow molecular weight distribution.

Accordingly, if ethylene polymers having high melt tension, small stress in the high-shear region, good heat stability, excellent mechanical strength and narrow composition distribution is developed, their industrial value will be extremely high.

The present invention is intended to solve such problems associated with the prior art as described above, and it is an object of the invention to provide adhesive ethylene copolymer resin compositions having high adhesive strength to polystyrene resins, ABS resin, polyacrylonitrile resins, polyester resins, polycarbonate resins and polyvinylidene chloride resins even in an atmosphere of high temperatures, and to provide laminates using the compositions.

It is another object of the invention to provide adhesive ethylene copolymer resin compositions having excellent heat stability, moldability and transparency and capable of forming film layers of high adhesive strength to metals and materials of high polarity, and to provide laminates using the compositions.

DISCLOSURE OF THE INVENTION

The first adhesive ethylene copolymer resin composition according to the invention is a composition [Ia] comprising:

50 to 99% by weight of a modified ethylene/α-olefin copolymer [A2] obtained by graft-modifying a long-chain branched ethylene/α-olefin copolymer [A1] comprising ethylene and an α-olefin of 3 to 20 carbon atoms with an unsaturated carboxylic acid or its derivative, or 50 to 99% by weight of the unmodified ethylene/α-olefin copolymer [A1] and the modified ethylene/α-olefin copolymer [A2], said unmodified long-chain branched ethylene/α-olefin copolymer [A1] being prepared by the use of an olefin polymerization catalyst comprising a Group IV transition metal compound (a) containing a ligand having cyclopentadienyl skeleton and an organoaluminum oxy-compound (b), and 1 to 50% by weight of a tackifier [B];

wherein the ethylene/α-olefin copolymer [A1] has the following properties:

the density (d) is in the range of 0.850 to 0.895 g/cm³, and the melt flow rate (MFR) at 190° C. under a load of 2.16 kg is in the range of 0.01 to 200 g/10 min; and the composition [Ia] has the following properties:

the density (d) is in the range of 0.870 to 0.900 g/cm³, the melt flow rate (MFR) at 190° C. under a load of 2.16 kg is in the range of 0.1 to 100 g/10 min, the crystallinity, as measured by X-ray diffractometry, is less than 40%, and the graft quantity based on the total amount of the composition [Ia] is in the range of 0.0001 to 5% by weight.

The second adhesive ethylene copolymer resin composition according to the invention is a composition [Ib] comprising:

49 to 95% by weight of at least one component selected from the group consisting of the long-chain branched ethylene/α-olefin copolymer [A1] and the modified ethylene/α-olefin copolymer [A2], 1 to 50% by weight of a tackifier [B], and 1 to 30% by weight of at least one component selected from the group consisting of an ethylene homopolymer [C1] prepared by the use of an olefin polymerization catalyst comprising a Group IV transition metal compound and an organoaluminum compound, an ethylene/α-olefin copolymer [C2] comprising ethylene and an α-olefin of 3 to 20 carbon atoms, which is prepared by the use of the same catalyst as for the copolymer [C1], a modified ethylene homopolymer [C3] obtained by graft-modifying the ethylene homopolymer [C1] with an unsaturated carboxylic acid or its derivative, and a modified ethylene/α-olefin copolymer [C4] obtained by graft-modifying the ethylene/α-olefin copolymer [C2] with an unsaturated carboxylic acid or its derivative, said composition [Ib] containing at least one component selected from the group consisting of the modified ethylene/α-olefin copolymer [A2], the modified ethylene homopolymer [C3] and the modified ethylene/α-olefin copolymer [C4];

wherein the ethylene homopolymer [C1] and the ethylene/α-olefin copolymer [C2] have the following properties:

the density (d) is in the range of 0.900 to 0.970 g/cm³, the melt flow rate (MFR) at 190° C. under a load of 2.16 kg is in the range of 0.01 to 100 g/10 min, and the crystallinity, as measured by X-ray diffractometry, is not less than 30%; and the composition [Ib] has the following properties:

the density (d) is In the range of 0.870 to 0.900 g/cm³, the melt flow rate (MFR) at 190° C. under a load of 2.16 kg is in the range of 0.1 to 100 g/10 min, the crystallinity, as measured by X-ray diffractometry, is less than 40%, and the graft quantity based on the total amount of the composition [Ib] is in the range of 0.0001 to 5% by weight.

The third adhesive ethylene copolymer resin composition according to the invention is a composition 25 [IIa] comprising:

50 to 95% by weight of the modified ethylene/α-olefin copolymer [A2], or 50 to 95% by weight of the unmodified ethylene/α-olefin copolymer [A1] and the modified ethylene/α-olefin copolymer [A2], and 5 to 50% by weight of an ethylene/vinyl acetate copolymer [D];

wherein the ethylene/vinyl acetate copolymer [D] has the following properties:

the melt flow rate (MFR) at 190° C. under a load of 2.16 kg is in the range of 0.1 to 50 g/10 min, and the vinyl acetate content is in the range of 5 to 40% by weight; and the composition [IIa] has the following properties:

the density (d) is in the range of 0.870 to 0.900 g/cm³, the melt flow rate (MFR) at 190° C. under a load of 2.16 kg is in the range of 0.1 to 100 g/10 min, the crystallinity, as measured by X-ray diffractometry, is less than 30%, and the graft quantity based on the total amount of the composition [IIa] is in the range of 0.0001 to 5% by weight.

The fourth adhesive ethylene copolymer resin composition according to the invention is a composition [IIb] comprising:

50 to 95% by weight of at least one component selected from the group consisting of the long-chain branched ethylene/α-olefin copolymer [A1] and the modified ethylene/α-olefin copolymer [A2], 4 to 40% by weight of the ethylene/vinyl acetate copolymer [D], and 1 to 30% by weight of at least one component selected from the group consisting of an ethylene homopolymer [C1] prepared by the use of an olefin polymerization catalyst comprising a Group IV transition metal compound and an organoaluminum compound, an ethylene/α-olefin copolymer [C2] comprising ethylene and an α-olefin of 3 to 20 carbon atoms, which is prepared by the use of the same catalyst as for the copolymer [C1], a modified ethylene homopolymer [C3] obtained by graft-modifying the ethylene homopolymer [C1] with an unsaturated carboxylic acid or its derivative, and a modified ethylene/α-olefin copolymer [C4] obtained by graft-modifying the ethylene/α-olefin copolymer [C2] with an unsaturated carboxylic acid or its derivative, said composition [IIb] containing at least one component selected from the group consisting of the modified ethylene/α-olefin copolymer [A2], the modified ethylene homopolymer [C3] and the modified ethylene/α-olefin copolymer [C4];

wherein the ethylene homopolymer [C1] and the ethylene/α-olefin copolymer [C2] have the following properties:
the density (d) is in the range of 0.900 to 0.970 g/cm$^3$,
the melt flow rate (MFR) at 190° C. under a load of 2.16 kg is in the range of 0.01 to 100 g/10 min, and
the crystallinity, as measured by X-ray diffractometry, is not less than 30%; and the composition [IIb] has the following properties:
the density (d) is in the range of 0.870 to 0.900 g/cm$^3$,
the melt flow rate (MFR) at 190° C. under a load of 2.16 kg is in the range of 0.1 to 100 g/10 min,
the crystallinity, as measured by X-ray diffractometry, is less than 30%, and
the graft quantity based on the total amount of the composition [IIb] is in the range of 0.0001 to 5% by weight.

The unmodified ethylene/α-olefin copolymer [A1] used in the above compositions [Ia], [Ib], [IIa] and [IIb] preferably has the following properties:
the ethylene content is in the range of 35 to 98% by weight,
the density (d) is in the range of 0.850 to 0.980 g/cm$^3$,
the melt flow rate (MFR$_2$) at 190° C. under a load of 2.16 kg is in the range of 0.01 to 200 g/10 min,
the melt tension (MT (g)) and the melt flow rate (MFR$_2$) at 190° C. satisfy the following relation $$MT > 1.55 \times MFR_2^{-1.09},$$

the ratio (MFR$_{10}$/MFR$_2$) of the melt flow rate (MFR$_{10}$) at 190° C. under a load of 10 kg to the melt flow rate (MFR$_2$) at 190° C. under a load of 2.16 kg is in the range of 7 to 50,
the B value, which indicates randomness of the copolymerized monomer sequence distribution and is determined by the following equation, is in the range of 0.9 to 2, $$B = P_{OE}/2P_O \cdot P_E$$

wherein P$_E$ is a molar fraction of the ethylene units contained in the copolymer, P$_O$ is a molar fraction of the α-olefin units contained in the copolymer, and P$_{OE}$ is a proportion of the ethylene/α-olefin sequences to all the dyad sequences in the copolymer, and
the crystallinity, as measured by X-ray diffractometry, is not more than 30%.

The fifth adhesive ethylene copolymer resin composition according to the invention is a composition [III] comprising a blend of:
50 to 95% by weight of a modified ethylene/α-olefin copolymer [E2] obtained by graft-modifying a linear ethylene/α-olefin copolymer [E1] comprising ethylene and an α-olefin of 3 to 20 carbon atoms with an unsaturated carboxylic acid or its derivative, or 50 to 95% by weight of the unmodified ethylene/α-olefin copolymer [E1] and the modified ethylene/α-olefin copolymer [E2], said linear ethylene/α-olefin copolymer [E1] being prepared by the use of an olefin polymerization catalyst comprising a Group IV transition metal compound (a) containing a ligand having cyclopentadienyl skeleton and an organoaluminum oxy-compound (b), and 5 to 50% by weight of an olefin elastomer [F];
wherein the ethylene/α-olefin copolymer [E1] has the following properties:
the density (d) is in the range of 0.900 to 0.965 g/cm$^3$, and
the melt flow rate (MFR) at 190° C. under a load of 2.16 kg is in the range of 0.01 to 200 g/10 min; and
the olefin elastomer [F] has the following properties:
the density (d) is in the range of 0.850 to 0.895 g/cm$^3$,
the melt flow rate (MFR) at 190° C. under a load of 2.16 kg is in the range of 0.01 to 200 g/10 min, and
the crystallinity, as measured by X-ray diffractometry, is less than 30%.

The blend of the modified ethylene/α-olefin copolymer [E2] and the olefin elastomer [F] and the blend of the unmodified ethylene/α-olefin copolymer [E1], the modified ethylene/α-olefin copolymer [E2] and the olefin elastomer [F] preferably have the following properties:
the density (d) is in the range of 0.870 to 0.960 g/cm$^3$,
the melt flow rate (MFR) at 190° C. under a load of 2.16 kg is in the range of 0.01 to 100 g/10 min,
the graft quantity of the graft group derived from the unsaturated carboxylic acid or its derivative is in the range of 0.01 to 5% by weight, and
the crystallinity, as measured by X-ray diffractometry, is not less than 15%.

The unmodified ethylene/α-olefin copolymer [E1] is preferably a linear ethylene/α-olefin copolymer having the following properties:
the density (d) is in the range of 0.900 to 0.965 g/cm$^3$,
the melt flow rate (MFR) at 190° C. under a load of 2.16 kg is in the range of 0.01 to 200 g/10 min,
the temperature (Tm (°C.)) at the position of the maximum peak of an endotherm curve of the copolymer measured by a differential scanning calorimeter (DSC) and the density (d) satisfy the relation $$Tm < 400 \times d - 250,$$

the melt tension (MT (g)) and the melt flow rate (MFR) at 190° C. satisfy the relation $$MT \leq 2.2 \times MFR^{-0.84}, \text{ and}$$

the quantity fraction (W (% by weight)) of a decane-soluble component of the copolymer at 23° C. and the density (d) satisfy the relation in the case of MFR ≤ 10 g/10 min:

$$W < 80 \times \exp(-100(d-0.88)) + 0.1,$$

in the case of MFR > 10 g/10 min:

$$W < 80 \times (MFR-9)^{0.26} \times \exp(-100(d-0.88)) + 0.1.$$

The olefin elastomer [F] is preferably an ethylene/α-olefin copolymer containing constituent units derived from ethylene in amounts of 75 to 95% by mol.

The first and the second adhesive ethylene copolymer resin compositions according to the invention show excellent moldability and have high adhesive strength to polystyrene resins, ABS resin, polyacrylonitrile resins and ethylene/vinyl acetate copolymer saponified resins (EVOH).

The third and the fourth adhesive ethylene copolymer resin compositions according to the invention show excellent moldability and have high adhesive strength to polyester resins, polycarbonate resins, polyvinylidene chloride resins and ethylene/vinyl acetate copolymer saponified resins (EVOH).

The fifth adhesive ethylene copolymer resin composition according to the invention shows excellent moldability and has high adhesive strength to nylon, ethylene/vinyl copolymers, polyesters and metals.

The first laminate according to the invention is a laminate having a layer structure of three layers or a layer structure of four or more layers including said three layers, said three-layer structure being formed by superposing a resin selected from the group consisting of a polystyrene resin, an ABS resin and a polyacrylonitrile resin, the adhesive ethylene copolymer resin composition [Ia] or [Ib] and an ethylene/vinyl acetate copolymer saponified resin (EVOH) upon each other in this order in a molten state and cooling those resins.

The second laminate according to the invention is a laminate having a layer structure of three layers or a layer structure of four or more layers including said three layers, said three-layer structure being formed by superposing a resin selected from the group consisting of a polyester resin, a polycarbonate resin and a polyvinylidene chloride resin, the adhesive ethylene copolymer resin composition [IIa] or [IIb] and an ethylene/vinyl acetate copolymer saponified resin (EVOH) upon each other in this order in a molten state and cooling those resins.

The third laminate according to the invention is a laminate comprising a layer of the adhesive ethylene copolymer resin composition [III] and a layer of a polar material or a metal.

The polar material is preferably an ethylene/vinyl alcohol copolymer, polyamide or polyester.

BEST MODE FOR CARRYING OUT OF THE INVENTION

The adhesive ethylene copolymer resin compositions and the laminates using the compositions according to the invention will be described in detail hereinafter The first adhesive ethylene copolymer resin composition of the invention comprises:
- a specific amount of a modified ethylene/α-olefin copolymer [A2], or a specific amount of an unmodified ethylene/α-olefin copolymer [A1] and a modified ethylene/α-olefin copolymer [A2], and
- a specific amount of a tackifier [B].

The second adhesive ethylene copolymer resin composition of the invention comprises:
- a specific amount of at least one component selected from the group consisting of a long-chain branched ethylene/α-olefin copolymer [A1] and a modified ethylene/α-olefin copolymer [A2],
- a specific amount of a tackifier [B], and
- a specific amount of at least one component selected from the group consisting of an ethylene homopolymer [C1], an ethylene/α-olefin copolymer [C2], a modified ethylene homopolymer [C3] and a modified ethylene/α-olefin copolymer [C4],
- said composition containing at least one component selected from the group consisting of the modified ethylene/α-olefin copolymer [A2], the modified ethylene homopolymer [C3] and the modified ethylene/α-olefin copolymer [C4].

The third adhesive ethylene copolymer resin composition of the invention comprises:
- a specific amount of a modified ethylene/α-olefin copolymer [A2], or a specific amount of an unmodified ethylene/α-olefin copolymer [A1] and a modified ethylene/α-olefin copolymer [A2], and
- a specific amount of an ethylene/vinyl acetate copolymer [D].

The fourth adhesive ethylene copolymer resin composition of the invention comprises:
- a specific amount of at least one component selected from the group consisting of a long-chain branched ethylene/α-olefin copolymer [A1] and a modified ethylene/α-olefin copolymer [A2],
- a specific amount of an ethylene/vinyl acetate copolymer [D], and
- a specific amount of at least one component selected from the group consisting of an ethylene homopolymer [C1], an ethylene/α-olefin copolymer [C2], a modified ethylene homopolymer [C3] and a modified ethylene/α-olefin copolymer [C4],
- said composition containing at least one component selected from the group consisting of the modified ethylene/α-olefin copolymer [A2], the modified ethylene homopolymer [C3] and the modified ethylene/α-olefin copolymer [C4].

The fifth adhesive ethylene copolymer resin composition of the invention comprises:
- a blend of a specific amount of a modified ethylene/α-olefin copolymer [E2] and a specific amount of an olefin elastomer [F], or
- a blend of a specific amount of an unmodified ethylene/α-olefin copolymer [E1], a specific amount of a modified ethylene/α-olefin copolymer [E2] and a specific amount of an olefin elastomer [F].

First, each component is described.

Unmodified Ethylene/α-Olefin Copolymer [A1]

The unmodified ethylene/α-olefin copolymer [A1] for use in the invention is a long-chain branched random copolymer of ethylene and an α-olefin of 3 to 20 carbon atoms, which is prepared by the use of a specific olefin polymerization catalyst (a kind of "metallocene catalyst").

Examples of the α-olefins of 3 to 20 carbon atoms copolymerizable with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [A1], the ethylene content is usually 35 to 98% by weight, preferably 65 to 97% by weight, more preferably 70 to 95% by weight, and the content of the α-olefin of 3 to 20 carbon atoms is usually 2 to 65% by weight, preferably 3 to 35% by weight, more preferably 5 to 30% by weight. The total amount of those components is 100% by weight.

The composition of an ethylene/α-olefin copolymer can be determined by measuring a $^{13}$C-NMR spectrum of a sample obtained by homogeneously dissolving about 200 mg of the copolymer in 1 ml of hexachlorobutadiene in a sample tube having a diameter of 10 mm under the measuring conditions of a measuring temperature of 120° C., a measuring frequency of 25.05 MHz, a spectrum width of 1,500 Hz, a pulse repetition time of 4.2 sec and a pulse width of 6 μsec.

The ethylene/α-olefin copolymer [A1] preferably has the following properties (i) and (ii), more preferably has the following properties (i) to (vi), and particularly preferably has the following properties (i) to (viii).

(i) The density (d) of the ethylene/α-olefin copolymer [A1] is in the range of 0.850 to 0.895 g/cm$^3$, preferably 0.855 to 0.890 g/cm$^3$, more preferably 0.860 to 0.890 g/cm$^3$.

The density (d) is measured in the following manner. Strands obtained in the measurement of melt flow rate (MFR) at 190° C. under a load of 2.16 kg are heat treated at 120° C. for 1 hour and slowly cooled to room temperature over a period of 1 hour. Then, the density is measured by a gradient density tube.

(ii) The melt flow rate (sometimes expressed by MFR or $MFR_2$) of the ethylene/α-olefin copolymer [A1] is in the range of 0.01 to 200 g/10 min, preferably 0.05 to 50 g/10 min, more preferably 0.1 to 20 g/10 min.

The melt flow rate (MFR) is measured under the conditions of a temperature of 190° C. and a load of 2.16 kg in accordance with ASTM D 1238-65T.

(iii) The melt tension (MT (g)) of the ethylene/α-olefin copolymer [A1] and the melt flow rate ($MFR_2$ (g/10 min)) thereof at 190° C. satisfy the following relation $$MT > 1.55 \times MFR_2^{-1.09},$$

preferably $$MT > 1.56 \times MFR_2^{-1.09},$$

more preferably $$MT > 1.57 \times MFR_2^{-1.09}.$$

The ethylene/α-olefin copolymer having a melt tension and a melt flow rate satisfying the above relation has higher melt tension and better moldability than the conventional ethylene/α-olefin copolymers.

The melt tension (MT (g)) is determined by measuring a stress given when a molten polymer is stretched at a constant rate. That is, the produced polymer powder is melted by a conventional method and then pelletized to give a sample to be measured. The measurement is carried out using a MT measuring machine (manufacture by Toyo Seiki Seisakusho K.K.) under the conditions of a resin temperature of 190° C., an extrusion speed of 15 mm/min, a take-up rate of 10 to 20 m/min, a nozzle diameter of 2.09 mm and a nozzle length of 8 mm. In the pelletizing, 0.05% by weight of tri(2,4-di-t-butylphenyl)phosphate as a secondary antioxidant, 0.1% by weight of n-octadecyl-3-(4'-hydroxy-3',5'-di-t-butylphenyl) propionate as a heat stabilizer and 0.05% by weight of calcium stearate as a hydrochloric acid absorber are previously added to the ethylene/α-olefin copolymer.

(iv) The ratio ($MFR_{10}/MFR_2$) of the melt flow rate ($MFR_{10}$) of the ethylene/α-olefin copolymer [A1] at 190° C. under a load of 10 kg to the melt flow rate ($MFR_2$) thereof at 190° C. under a load of 2.16 kg is in the range of 7 to 50, preferably 7 to 45.

The ethylene/α-olefin copolymer having $MFR_{10}/MFR_2$ of 7 to 50 exhibits extremely good flowability.

(v) The B value of the ethylene/α-olefin copolymer [A1], which indicates randomness of the copolymerized monomer sequence distribution and is determined by the following equation, is in the range of 0.9 to 2, $$B = P_{OE}/2P_O \cdot P_E$$

wherein $P_E$ is a molar fraction of the ethylene units contained in the copolymer, $P_O$ is a molar fraction of the α-olefin units contained in the copolymer, and $P_{OE}$ is a proportion of the ethylene/α-olefin sequences to all the dyad sequences in the copolymer.

The B value serves as an indication of a monomer component distribution in the copolymer chains, and is determined by the above equation using the $P_E$, $P_O$ and $P_{OE}$ values found in accordance with the reports by G. J. Ray (Macromolecules, 10, 773 (1977)), J. C. Randall (Macromolecules, 15, 353 (1982), J. Polymer Science, Polymer Physics Ed., 11, 275 (1973)) and K. Kimura (Polymer, 25, 441 (1984)). As the B value becomes larger, the number of block-like sequences becomes smaller, and this means that the distribution of ethylene and the α-olefin is uniform and the composition distribution of the copolymer is narrow.

The B value, which indicates width of the composition distribution, is determined in the following manner. In a sample tube having a diameter of 10 mm, about 200 mg of a copolymer is homogeneously dissolved in 1 ml of hexachlorobutadiene to give a sample. A $^{13}$C-NMR spectrum of the sample is measured under the conditions of a measuring temperature of 120° C., a measuring frequency of 25.05 MHz, a spectrum width of 1,500 Hz, a filter width of 1,500 Hz, a pulse repetition time of 4.2 sec, a pulse width of 7 μsec and a number of integration times of 2,000 to 5,000. From the spectrum, the $P_E$, $P_O$ and $P_{OE}$ values are found, and the B value is calculated by the above equation.

(vi) The crystallinity, as measured by X-ray diffractometry, is not more than 30%.

(vii) The molecular weight distribution (Mw/Mn, Mw: weight-average molecular weight, Mn: number-average molecular weight) of the ethylene/α-olefin copolymer [A1], as measured by GPC, is in the range of 1.5 to 4, preferably 1.5 to 3.5.

The molecular weight distribution (Mw/Mn) was measured in the following manner using GPC-150C manufactured by Millipore Co.

A separatory column of TSK-GNH-HT having a diameter of 72 mm and a length of 600 mm was used. The column temperature was set at 140° C. A sample (concentration: 0.1% by weight, quantity: 500 microliters) was moved in the column at a rate of 1.0 ml/min using o-dichlorobenzene (available from Wako Junyaku Kogyo K.K.) as a mobile phase and 0.025% by weight of BHT (available from Takeda Chemical Industries, LTD.) as an antioxidant. A differential refractometer was used as a detector. With regard to standard polystyrenes, polystyrenes available from TOSOH K.K. were used as those of Mw<1,000 and Mw>4×10$^6$, and polystyrenes available from Pressure Chemical Co. were used as those of 1,000<Mw<4×10$^6$.

(viii) The number of the unsaturated bonds present in molecules of the ethylene/α-olefin copolymer [A1] desirably is not more than 0.5 per 1,000 carbon atoms, and it is not more than 1 per one molecule of the copolymer.

The quantitative determination of the unsaturated bonds is carried out in the following manner. An area intensity of signals assigned to those other than double bonds (i.e., signals within the range of 10 to 50 ppm) and an area intensity of signals assigned to double bonds (i.e., signals within the range of 105 to 150 ppm) are found in an integral curve using $^{13}$C-NMR. The number of the unsaturated bonds is determined as a ratio between those intensities.

The ethylene/α-olefin copolymer [A1] can be prepared by, for example, copolymerizing ethylene and an α-olefin of 3 to 20 carbon atoms in the presence of an olefin polymerization catalyst (a kind of "metallocene compound") formed from:

(a) a Group IVB transition metal compound having a bidentate ligand wherein two groups selected from a specific indenyl group and its substituted derivatives are linked through a carbon-containing group or a silicon-containing group, (b) an organoaluminum oxy-compound, and optionally (c) a carrier, and (d) an organoaluminum compound, in such a manner that the resulting copolymer has a density of 0.850 to 0.895 g/cm$^3$.

The olefin polymerization catalyst and the catalyst components are described below.

The Group IVB transition metal compound (a) having a bidentate ligand wherein two groups selected from a specific indenyl group and its substituted derivatives are linked through a carbon-containing group or a silicon-containing group is specifically a transition metal compound represented by the following formula (I).

$$MKL_{x-2} \tag{I}$$

In the formula (I), M is a transition metal atom selected from Group IVB of the periodic table, specifically, zirconium, titanium or hafnium, preferably zirconium.

x is a valence of the transition metal atom M, and x-2 represents the number of L.

K is a ligand coordinated to the transition metal atom, and is a bidentate ligand wherein the same or different two groups selected from a specific indenyl group, its partially hydrogenated products, substituted indenyl groups and their partially hydrogenated products are linked through a carbon-containing group such as a lower alkylene group or a silicon-containing group such as dialkylsilylene.

Examples of the substituted indenyl groups include 4-phenylindenyl, 2-methyl-4-phenylindenyl, 2-methyl-4-naphthylindenyl, 2-methyl-4-anthracenylindenyl, 2-methyl-4-phenanthrylindenyl, 2-ethyl-4-phenylindenyl, 2-ethyl-4-naphthylindenyl, 2-ethyl-4-anthracenylindenyl, 2-ethyl-4-phenanthrylindenyl, 2-propyl-4-phenylindenyl, 2-propyl-4-naphthylindenyl, 2-propyl-4-anthracenylindenyl and 2-propyl-4-phenanthrylindenyl.

L is a hydrocarbon group of 1 to 12 carbon atoms, an alkoxy group, an aryloxy group, a halogen atom, a trialkylsilyl group or a hydrogen atom.

Examples of the hydrocarbon groups of 1 to 12 carbon atoms include alkyl groups, cycloalkyl groups, aryl groups and aralkyl groups. More specifically, there can be mentioned alkyl groups, such as methyl, ethyl, n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

The halogen atoms are fluorine, chlorine, bromine and iodine.

Examples of the trialkylsilyl groups include trimethylsilyl, triethylsilyl and triphenylsilyl.

Listed below are examples of the transition metal compounds represented by the formula (I).

rac-Dimethylsilylene-bis{1-(4-phenylindenyl)}zirconium dichloride,
rac-Dimethylsilylene-bis{1-(2-methyl-4-phenylindenyl)}zirconium dichloride,
rac-Dimethylsilylene-bis{1-(2-methyl-4-(α-naphthyl)indenyl)}zirconium dichloride,
rac-Dimethylsilylene-bis{1-(2-methyl-4-(β-naphthyl)indenyl)}zirconium dichloride,
rac-Dimethylsilylene-bis{1-(2-methyl-4-(1-anthracenyl)indenyl)}zirconium dichloride,
rac-Dimethylsilylene-bis{1-(2-methyl-4-(2-anthracenyl)indenyl)}zirconium dichloride,
rac-Dimethylsilylene-bis{1-(2-methyl-4-(9-anthracenyl)indenyl))}zirconium dichloride,
rac-Dimethylsilylene-bis{1-(2-methyl-4-(9-phenanthryl)indenyl)}zirconium dichloride,
rac-Dimethylsilylene-bis{1-(2-methyl-4-(p-fluorophenyl)indenyl)}zirconium dichloride,
rac-Dimethylsilylene-bis{1-(2-methyl-4-(pentafluorophenyl)indenyl)}zirconium dichloride,
rac-Dimethylsilylene-bis{1-(2-methyl-4-(p-chlorophenyl)indenyl)}zirconium dichloride,
rac-Dimethylsilylene-bis{1-(2-methyl-4-(m-chlorophenyl)indenyl)}zirconium dichloride,
rac-Dimethylsilylene-bis{1-(2-methyl-4-(o-chlorophenyl)indenyl)}zirconium dichloride,
rac-Dimethylsilylene-bis{1-(2-methyl-4-(o,p-dichlorophenyl)phenylindenyl)}zirconium dichloride,
rac-Dimethylsilylene-bis{1-(2-methyl-4-(p-bromophenyl)indenyl)}zirconium dichloride,
rac-Dimethylsilylene-bis{1-(2-methyl-4-(p-tolyl)indenyl)}zirconium dichloride,
rac-Dimethylsilylene-bis{1-(2-methyl-4-(m-tolyl)indenyl)}zirconium dichloride,
rac-Dimethylsilylene-bis{1-(2-methyl-4-(o-tolyl)indenyl)}zirconium dichloride,
rac-Dimethylsilylene-bis{1-(2-methyl-4-(o,o'-dimethylphenyl)indenyl)}zirconium dichloride,
rac-Dimethylsilylene-bis{1-(2-methyl-4-(p-ethylphenyl)indenyl)}zirconium dichloride,
rac-Dimethylsilylene-bis{1-(2-methyl-4-(p-i-propylphenyl)indenyl)}zirconium dichloride,
rac-Dimethylsilylene-bis{1-(2-methyl-4-(p-benzylphenyl)indenyl)}zirconium dichloride,
rac-Dimethylsilylene-bis{1-(2-methyl-4-(p-biphenyl)indenyl)}zirconium dichloride,
rac-Dimethylsilylene-bis{1-(2-methyl-4-(m-biphenyl)indenyl)}zirconium dichloride,
rac-Dimethylsilylene-bis{1-(2-methyl-4-(p-trimethylsilylenephenyl)indenyl)}zirconium dichloride,
rac-Dimethylsilylene-bis{1-(2-methyl-4-(m-trimethylsilylenephenyl)indenyl)}zirconium dichloride,
rac-Dimethylsilylene-bis{1-(2-ethyl-4-phenylindenyl)}zirconium dichloride,
rac-Dimethylsilylene-bis{1-(2-ethyl-4-(α-naphthyl)indenyl)}zirconium dichloride,
rac-Dimethylsilylene-bis{1-(2-ethyl-4-(β-naphthyl)indenyl)}zirconium dichloride,
rac-Dimethylsilylene-bis{1-(2-ethyl-4-(1-anthracenyl)indenyl)}zirconium dichloride,
rac-Dimethylsilylene-bis{1 (2-ethyl-4-(2-anthracenyl)indenyl)}zirconium dichloride,
rac-Dimethylsilylene-bis{1-(2-ethyl-4-(9-anthracenyl)indenyl)}zirconium dichloride,
rac-Dimethylsilylene-bis{1-(2-ethyl-4-(9-phenanthryl)indenyl)}zirconium dichloride,
rac-Diphenylsilylene-bis{1-(2-ethyl-4-phenylindenyl)}zirconium dichloride,
rac-Dimethylsilylene-bis{1-(2-phenyl-4-phenylindenyl)}zirconium dichloride,
rac-Dimethylsilylene-bis{1-(2-n-propyl-4-phenylindenyl)}zirconium dichloride,
rac-Dimethylsilylene-bis{1-(2-n-propyl-4-(α-naphthyl)indenyl)}zirconium dichloride, rac-Dimethylsilylene-bis{1-(2-n-propyl-4-(β-naphthyl)indenyl)}zirconium dichloride,
rac-Dimethylsilylene-bis{1-(2-n-propyl-4-(1-anthracenyl)indenyl)}zirconium dichloride,
rac-Dimethylsilylene-bis{1-(2-n-propyl-4-(2-anthracenyl)indenyl)}zirconium dichloride,
rac-Dimethylsilylene-bis{1-(2-n-propyl-4-(9-anthracenyl)indenyl)}zirconium dichloride,
rac-Dimethylsilylene-bis{1-(2-n-propyl-4-(9-phenanthryl)indenyl)}zirconium dichloride,
rac-Dimethylsilylene-bis{1-(2-i-butyl-4-phenylindenyl)}zirconium dichloride,
rac-Dimethylsilylene-bis{1-(2-i-butyl-4-(α-naphthyl)indenyl)}zirconium dichloride,
rac-Dimethylsilylene-bis{1-(2-i-butyl-4-(β-naphthyl)indenyl)}zirconium dichloride,
rac-Dimethylsilylene-bis{1-(2-i-butyl-4-(1-anthracenyl)indenyl)}zirconium dichloride,
rac-Dimethylsilylene-bis{1-(2-i-butyl-4-(2-anthracenyl)indenyl)}zirconium dichloride,
rac-Dimethylsilylene-bis{1-(2-i-butyl-4-(9-anthracenyl)indenyl)}zirconium dichloride,
rac-Dimethylsilylene-bis{1-(2-i-butyl-4-(9-phenanthryl)indenyl)}zirconium dichloride,
rac-Diethylsilylene-bis{1-(2-methyl-4-phenylindenyl)}zirconium dichloride,
rac-Di(i-propyl)silylene-bis{1-(2-methyl-4-phenylindenyl)}zirconium dichloride,
rac-Di(n-butyl)silylene-bis{1-(2-methyl-4-phenylindenyl)}zirconium dichloride,
rac-Dicyclohexylsilylene-bis{1-(2-methyl-4-phenylindenyl)}zirconium dichloride,
rac-Methylphenylsilylene-bis{1-(2-methyl-4-phenylindenyl)}zirconium dichloride,
rac-Diphenylsilylene-bis{1-(2-methyl-4-phenylindenyl)}zirconium dichloride,
rac-Di(p-tolyl)silylene-bis{1-(2-methyl-4-phenylindenyl)}zirconium dichloride,
rac-Di(p-chlorophenyl)silylene-bis{1-(2-methyl-4-phenylindenyl)}zirconium dichloride,
rac-Methylene-bis{1-(2-methyl-4-phenylindenyl)}zirconium dichloride,
rac-Ethylene-bis{1-(2-methyl-4-phenylindenyl)}zirconium dichloride,
rac-Dimethylgermyl-bis{1-(2-methyl-4-phenylindenyl)}zirconium dichloride,
rac-Dimethylsilylene-bis{1-(2-methyl-4-phenylindenyl)}zirconium dibromide,
rac-Dimethylsilylene-bis{1-(2-methyl-4-phenylindenyl)}zirconium dimethyl,
rac-Dimethylsilylene-bis{1-(2-methyl-4-phenylindenyl)}zirconium methylchloride,
rac-Dimethylsilylene-bis{1-(2-methyl-4-phenylindenyl)}zirconium chloride SO$_2$Me,
rac-Dimethylsilylene-bis{1-(2-methyl-4-phenylindenyl)}zirconium chloride OSO$_2$Me,
rac-Dimethylsilylene-bis{1-(2-methyl-4-phenylindenyl)}titanium dichloride, and
rac-Dimethylsilylene-bis{1-(2-methyl-4-phenylindenyl)}hafnium dichloride.

Also employable in the invention are transition metal compounds wherein zirconium is replaced with titanium or hafnium in the above-exemplified zirconium compounds.

Next, the organoaluminum oxy-compound (b) is described.

The organoaluminum oxy-compound (b) for forming the olefin polymerization catalyst used in the preparation of the unmodified ethylene/α-olefin copolymer [A1] may be a benzene-soluble aluminoxane conventionally known or a benzene-insoluble organoaluminum oxy-compound disclosed in Japanese Patent Laid-Open Publication No. 276807/1990.

The aluminoxane can be prepared by, for example, the following processes.

(1) An organoaluminum compound such as trialkylaluminum is added to a hydrocarbon medium suspension of compounds containing adsorbed water or salts containing water of crystallization, e.g., magnesium chloride hydrate, copper sulfate hydrate, aluminum sulfate hydrate, nickel sulfate hydrate or cerous chloride hydrate, so as to allow the organoaluminum compound to react with the compound or the salt, followed by recovering aluminoxane as its hydrocarbon solution.

(2) Water, ice or water vapor is allowed to directly act on an organoaluminum compound such as trialkylaluminum in a medium such as benzene, toluene, ethyl ether or tetrahydrofuran, followed by recovering aluminoxane as its hydrocarbon solution.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is distilled off from the recovered solution of the aluminoxane and that the remainder is redissolved in a solvent.

Examples of the organoaluminum compounds used for preparing the aluminoxane include:

trialkylaluminums, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums, such as tricyclohexylaluminum and tricyclooctylaluminum;

dialkylaluminum halides, such as dimethylaluminum chloride, diethylaluminum chloride, diethylaluminum bromide and diisobutylaluminum chloride;

dialkylaluminum hydrides, such as diethylaluminum hydride and diisobutylaluminum hydride;

dialkylaluminum alkoxides, such as dimethylaluminum methoxide and diethylaluminum ethoxide; and dialkylaluminum aryloxides, such as diethylaluminum phenoxide.

Of these, particularly preferable are trialkylaluminums and tricycloalkylaluminums.

Also employable as the organoaluminum compound used for preparing the aluminoxane is isoprenylaluminum represented by the formula:

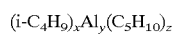

(wherein x, y, z are each a positive number, and z≧2x).

The organoaluminum compounds mentioned above are used singly or in combination.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; halides of these aromatic, aliphatic and alicyclic hydrocarbons, particularly chlorides and bromides thereof. Also employable are ethers such as ethyl ether and tetrahydrofuran. Of the solvents, particularly preferable are aromatic hydrocarbons.

The benzene-insoluble organoaluminum oxy-compound (b) employable in the invention contains an Al component, which is soluble in benzene at 60° C., in an amount of not more than 10%, preferably not more than 5%, particularly preferably not more than 2%, in terms of Al atom, and this compound is insoluble or slightly soluble in benzene.

The solubility of the organoaluminum oxy-compound in benzene can be determined in the following manner. The organoaluminum oxy-compound in the amount corresponding to 100 mg·atom of Al is suspended in 100 ml of benzene, and they are mixed by stirring at 60° C. for 6 hours. Then, the mixture is filtered at 60° C. through a G-5 glass filter equipped with a jacket. The solid remaining on the filter is washed four times with 50 ml of benzene at 60° C. to obtain a filtrate. The quantity (xmmol) of the Al atom present in the whole filtrate is measured to determine the solubility (x %).

The metallocene type transition metal compound (a) and/or the organoaluminum oxy-compound (b) described above may be used by supporting them on the below-described carrier (c).

The carrier (c) is an inorganic or organic, granular or particulate solid compound having a particle diameter of 10 to 300 μm, preferably 20 to 200 μm. As the inorganic carrier, porous oxide is preferably employed. Examples of such oxides include $SiO_2$, $Al_2O_3$, MgO, $ZrO_2$, $TiO_2$, $B_2O_3$, CaO, ZnO, BaO, $ThO_2$ and mixtures thereof such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Among them, preferable are those containing $SiO_2$ and/or $Al_2O_3$ as their major component.

The above-mentioned inorganic oxides may contain small amounts of carbonate component, sulfate component, nitrate component and oxide component, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

The properties of the carrier (c) vary depending on the type of the carrier and the process for the preparation thereof, but preferably used in the invention is a carrier having a specific surface area of 50 to 1,000 $m^2$/g, preferably 100 to 700 $m^2$/g, and a pore volume of 0.3 to 2.5 $cm^3$/g. The carrier may be used after calcined at 100 to 1,000° C., preferably 150 to 700° C., if desired.

Also employable as the carrier (c) is an organic, granular or particulate solid compound having a particle diameter of 10 to 300 μm. For example, (co)polymers produced mainly from α-olefins of 2 to 14 carbon atoms such as ethylene, propylene, 1-butene and 4-methyl-1-pentene or (co) polymers produced mainly from vinylcyclohexane or styrene are employable.

The organoaluminum compound [d] used in the invention can be represented by, for example, the following general formula (II):

$$R^a{}_n AlX_{3-n} \quad (II)$$

wherein $R^a$ is a hydrocarbon group of 1 to 12 carbon atoms, X is a halogen or hydrogen atom, and n is 1 to 3.

In the formula (II), $R^1$ is a hydrocarbon group of 1 to 12 carbon atoms, e.g., an alkyl group, a cycloalkyl group or an aryl group. Examples of such groups include methyl, ethyl, n-propyl, isopropyl, isobutyl, pentyl, hexyl, octyl, cyclopentyl, cyclohexyl, phenyl and tolyl.

Examples of such organoaluminum compounds (d) include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound [d] is a compound represented by the following formula (III):

$$R^a{}_n AlY_{3-n} \quad (III)$$

wherein $R^a$ is the same as $R^a$ in the formula (II);

Y is —$OR^b$ group, —$OSiR^c{}_3$ group, —$OAlR^d{}_2$ group, —$NR^e{}_2$ group, —$SiR^f{}_3$ group or —$N(R^g)AlR^h{}_2$ group;

n is 1 to 2;

$R^b$, $R^c$, $R^d$ and $R^h$ are each methyl, ethyl, isopropyl, isobutyl, cyclohexyl, phenyl or the like;

$R^e$ is hydrogen atom, methyl, ethyl, isopropyl, phenyl, trimethylsilyl or the like; and $R^f$ and $R^g$ are each methyl, ethyl or the like.

Examples of such organoaluminum compounds include the following compounds.

(I) compounds of the formula $R^a{}_n Al(OR^b)_{3-n}$, e.g., dimethylaluminum methoxide, diethylaluminum ethoxide and diisobutylaluminum methoxide.

(ii) compounds of the formula $R^a{}_n Al(OSiR^c{}_3)_{3-n}$, e.g., $ET_2Al(OSiMe_3)$, $(iso\text{-}Bu)_2Al(OSiMe_3)$ and $(iso\text{-}Bu)_2Al(OSiEt_3)$.

(iii) compounds of the formula $R^a{}_n Al(OAlR^d{}_2)_{3-n}$, e.g., $Et_2AlOAlEt_2$ and $(iso\text{-}Bu)_2AlOAl(iso\text{-}Bu)_2$.

(iv) compounds of the formula $R^a{}_n Al(NR^e{}_2)_{3-n}$, e.g., $Me_2AlNEt_2$, $Et_2AlNHMe$, $Me_2AlNHEt$, $Et_2AlN(SiMe_3)_2$ and $(iso\text{-}Bu)_2AlN(SiMe_3)_2$.

(v) compounds of the formula $R^a{}_n Al(SiR^f{}_3)_{3-n}$, e.g., $(iso\text{-}Bu)_2AlSiMe_3$.

(vi) compounds of the formula $R^a{}_n Al(N(R^g)AlR^h{}_2)_{3-n}$, e.g., $Et_2AlN(Me)AlEt_2$ and $(iso\text{-}Bu)_2AlN(Et)Al(iso\text{-}Bu)_2$.

Of the organoaluminum compounds represented by the formulas (II) and (III), preferable are compounds of the formulas $R^a{}_3Al$, $R^a{}_n Al(OR^b)_{3-n}$ and $R^a{}_n Al(OAlR^d{}_2)_{3-n}$, and particularly preferable are compounds of said formulas wherein $R^a$ is an isoalkyl group and n is 2.

In the preparation of the ethylene/α-olefin copolymer [A1], the catalyst prepared by contacting the transition metal compound (a), the organoaluminum oxy-compound (b), and optionally, the carrier (c) and the organoaluminum compound (d) is employed.

The catalyst used for preparing the ethylene/α-olefin copolymer [A1] may be a prepolymerized catalyst obtained by prepolymerizing an olefin in the presence of the transition metal compound (a), the organoaluminum oxy-compound (b), the carrier (c), and optionally, the organoaluminum compound (d). The prepolymerization can be carried out by introducing an olefin into an inert hydrocarbon solvent in the presence of the transition metal compound (a), the organoaluminum oxy-compound (b), the carrier (c), and optionally, the organoaluminum compound (d).

The ethylene/α-olefin copolymer [A1] used in the invention is obtained by copolymerizing ethylene and an α-olefin of 3 to 20 carbon atoms in the presence of the olefin polymerization catalyst or the prepolymerized catalyst.

The copolymerization of ethylene and the α-olefin is carried out in a phase of liquid such as solution or slurry, or in a gas phase. In the solution polymerization or the slurry polymerization, an inert hydrocarbon may be used as a solvent or the olefin itself may be used as the solvent.

Examples of the inert hydrocarbon solvents used in the solution polymerization or the slurry polymerization include aliphatic hydrocarbons, such as butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of the inert hydrocarbon media, preferable are aliphatic hydrocarbons, alicyclic hydrocarbons and petroleum fractions.

In the polymerization, the olefin polymerization catalyst is desirably used in such an amount that the concentration of the transition metal atom in the polymerization reaction system is usually $10^{-8}$ to $10^{-3}$ g·atom/liter, preferably $10^{-7}$ to $10^{-4}$ g·atom/liter.

In the solution polymerization or the slurry polymerization, the polymerization temperature is in the range of usually −50 to 100° C., preferably 0 to 90° C. In the gas phase polymerization, the polymerization temperature is in the range of usually 0 to 120° C., preferably 20 to 100° C.

The polymerization pressure is in the range of usually atmospheric pressure to 100 kg/cm$^2$, preferably 2 to 50 kg/cm$^2$. The polymerization can be carried out by any of batchwise, semi-continuous and continuous processes.

Further, the polymerization may be conducted in two or more stages under different reaction conditions.

Modified Ethylene/α-Olefin Copolymer [A2]

The modified ethylene/α-olefin copolymer [A2] for use in the invention is obtained by grafting an unsaturated carboxylic acid or its derivative on the above-described ethylene/α-olefin copolymer [A1].

Examples of the unsaturated carboxylic acids include acrylic acid, methacrylic acid, maleic acid, fumaric acid and itaconic acid.

Examples of the derivatives of unsaturated carboxylic acids include anhydrides, esters, amides, imides and metallic salts of unsaturated carboxylic acids.

More specifically, there can be mentioned:

anhydrides of unsaturated carboxylic acids, such as maleic anhydride, Hymic anhydride™ (endic anhydride), itaconic anhydride and citraconic anhydride;

esters of unsaturated carboxylic acids, such as methyl acrylate, methyl methacrylate, ethyl acrylate, ethyl methacrylate, glycidyl acrylate, monoethyl maleate, diethyl maleate, monomethyl fumarate, dimethyl fumarate, monomethyl itaconate and diethyl itaconate;

amides of unsaturated carboxylic acids, such as acrylamide, methacrylamide, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide and fumaric acid-N,N-dibutylamide;

imides of unsaturated carboxylic acids, such as maleimide, N-butylmaleimide and N-phenylmaleimide; and metallic salts of unsaturated carboxylic acids, such as sodium acrylate, sodium methacrylate, potassium acrylate and potassium methacrylate.

Of these, most preferable are maleic anhydride and Hymic anhydride™.

The graft modification can be carried out by conventional methods. For example, there are known a method of adding the unsaturated carboxylic acid or its derivative to the molten ethylene/α-olefin copolymer [A1] to perform graft copolymerization or a method of adding the unsaturated carboxylic acid or its derivative to the ethylene/α-olefin copolymer [A1] having been dissolved in a solvent to perform graft copolymerization. In each method, it is desirable to initiate the graft copolymerization reaction in the presence of a radical initiator so as to efficiently copolymerize the ethylene/α-olefin copolymer [A1] with the unsaturated carboxylic acid or its derivative as the graft monomer.

Examples of the radical initiators employable herein include organic peroxides and organic peresters, such as benzoyl peroxide, dichlorobenzoyl peroxide, dicumyl peroxide, di-t-butyl peroxide, 2,5-dimethyl-2,5-di(peroxybenzoate)hexyne-3, 1,4-bis(t-butylperoxyisopropyl)benzene, lauroyl peroxide, t-butyl peracetate, 2,5-dimethyl-2,5-di(t-butylperoxy)hexyne-3, 2,5-dimethyl-2,5-di(t-butylperoxy)hexane, t-butyl perbenzoate, t-butylperphenyl acetate, t-butyl perisobutyrate, t-butyl per-sec-octoate, t-butyl perpivalate, cunyl perpivalate and t-butyl perdiethylacetate; and azo compounds, such as azobisisobutyronitrile and dimethyl azoisobutyrate. Of these, preferable are dialkyl peroxides, such as dicumyl peroxide, di-t-butyl peroxide, 2,5-dimethyl-2,5-di(t-butylperoxy)hexyne-3, 2,5-dimethyl-2,5-di(t-butylperoxy)hexane and 1,4-bis(t-butylperoxyisopropyl)benzene.

The radical initiator is used in an amount of usually 0.001 to 1 part by weight based on 100 parts by weight of the ethylene/α-olefin copolymer [A1].

The graft reaction may be conducted in the presence of other monomers such as styrene.

The graft modification is carried out by reacting the above components at a temperature of usually 60 to 350° C., preferably 150 to 300° C., for a period of 3 minutes to 10 hours, preferably 3 minutes to 6 hours.

In the modified ethylene/α-olefin copolymer [A2] prepared as above, the graft quantity of the graft group derived from the unsaturated carboxylic acid or its derivative is in the range of usually 0.1 to 5.0% by weight, preferably 0.5 to 3.5% by weight. It is preferable that the graft quantity is adjusted so as to be within the range of 0.0001 to 5% by weight based on the whole adhesive ethylene copolymer resin composition of the invention. From the viewpoint of industrial production, it is preferable that a modified ethylene/α-olefin copolymer [A2] having a graft quantity of 0.01 to 6% by weight is previously prepared and then this modified ethylene/α-olefin copolymer [A2] is blended with the ethylene/α-olefin copolymer [A1] to adjust the graft quantity. Owing to this method, the graft quantity in the composition can be easily adjusted. The graft modification may be carried out by adding the unsaturated carboxylic acid or its derivative to the ethylene/α-olefin copolymer resin [A1] in such an amount that the above-mentioned graft quantity based on the aimed adhesive ethylene copolymer resin composition is obtained.

Tackifier [B]

The tackifier [B] for use in the invention is a solid amorphous polymer, and is used in various fields such as fields of adhesive tapes, paints and hot melt adhesives. As the tackifiers, the below-described various resins are employable, and they are classified based on the difference in the kinds of the starting monomers to be polymerized.

For example, there can be mentioned:

aliphatic hydrocarbon resins prepared by using, as main starting materials, a $C_4$ fraction and a C5 fraction obtained by cracking petroleum, naphtha or the like, mixtures thereof, and isoprene and 1,3-pentadiene in an optional fraction thereof such as a $C_5$ fraction;

aromatic hydrocarbon resins prepared by using, as main starting materials, styrene derivatives and indenes in a $C_9$ fraction obtained by cracking petroleum, naphtha or the like;

aliphatic/aromatic copolymerization hydrocarbon resins prepared by copolymerizing an optional fraction of a $C_4$ fraction and a $C_5$ fraction with a $C_9$ fraction;

alicyclic hydrocarbon resins prepared by hydrogenating aromatic hydrocarbon resins;

synthetic terpene hydrocarbon resins having structures containing aliphatic, alicyclic and aromatic hydrocarbon resins;

terpene hydrocarbon resins prepared by using, as starting materials, α,β-pinenes in turpentine oil;

coumarone-indene hydrocarbon resins prepared by using, as starting materials, indenes and styrenes in coal tar naphtha;

low-molecular weight styrene resins; and rosin hydrocarbon resins.

Of these tackifiers, the aliphatic hydrocarbon resins and the alicyclic hydrocarbon resins prepared by hydrogenating aromatic hydrocarbon resins are preferable, because they have good dispersibility in the ethylene/α-olefin copolymer resin [A1], the ethylene homopolymer [C1], the ethylene/α-olefin copolymer [C2] and their modified products ([A2], [C3] and [C4]). Among them, more preferable are alicyclic hydrocarbon resins having a softening point (measured by a ring and ball method) of 105 to 150° C., preferably 110 to 140° C., and having a hydrogenation degree of aromatic groups of not less than 80%, preferably not less than 85%.

Ethylene Homopolymer [C1] and Ethylene/α-Olefin Copolymer [C2]

Each of the ethylene homopolymer [C1] and the ethylene/α-olefin copolymer [C2] comprising ethylene and an α-olefin of 3 to 20 carbon atoms for use in the invention has a density of 0.900 to 0.970 g/cm³, preferably 0.910 to 0.970 g/cm³, and has a melt flow rate (MFR, ASTM D 1238-65T, 190° C., load of 2.16 kg) of 0.01 to 100 g/10 min, preferably 0.05 to 50 g/10 min, more preferably 0.1 to 30 g/10 min.

The density (d) is measured in the following manner. Strands obtained in the measurement of melt flow rate (MFR) at 190° C. under a load of 2.16 kg are heat treated at 120° C. for 1 hour and slowly cooled to room temperature over a period of 1 hour. Then, the density is measured by a gradient density tube.

Each of the ethylene homopolymer [C1] and the ethylene/α-olefin copolymer [C2] desirably has a crystallinity, as measured by X-ray diffractometry, of not less than 30%.

Examples of the α-olefins of 3 to 20 carbon atoms used for forming the ethylene/α-olefin copolymer [C2] include propylene, 1-butene, 1-pentene, 1-hexene, 4-methyl-1-pentene, 1-octene, 1-decene and mixtures thereof. Of these, α-olefins of 3 to 10 carbon atoms are particularly preferable.

In the invention, the ethylene homopolymer [C1] and the ethylene/α-olefin copolymer [C2] having a specific ethylene content are particularly preferably employed. In the ethylene/α-olefin copolymer [C2], the ethylene content is desired to be not less than 60% by weight and less than 100% by weight, preferably not less than 80% by weight and less than 100% by weight, particularly preferably not less than 90% by weight and less than 100% by weight, and the content of the α-olefin of 3 to 20 carbon atoms is desired to be not more than 40% by weight, preferably not more than 20% by weight, particularly preferably not more than 10% by weight.

The ethylene homopolymer [C1] and the ethylene/α-olefin copolymer [C2] for use in the invention can be prepared by conventional processes using an olefin polymerization catalyst comprising a Group IV transition metal compound and an organoaluminum compound, namely, known catalysts such as catalysts of Ti type, V type and Zr type.

Modified Product [C3] of Ethylene Homopolymer [C1] and Modified Product [C4] of Ethylene/α-Olefin Copolymer [C2]

The modified product [C3] of the ethylene homopolymer and the modified product [C4] of the ethylene/α-olefin copolymer for use in the invention are obtained by grafting an unsaturated carboxylic acid or its derivative on the ethylene homopolymer [C1] and the ethylene/α-olefin copolymer [C2], respectively.

Examples of the unsaturated carboxylic acids and their derivatives are the same compounds as described above for the modified ethylene/α-olefin copolymer [A2].

The graft modification can be carried out by conventional methods. For example, there are known a method of adding the unsaturated carboxylic acid or its derivative to the molten ethylene homopolymer [C1] or the molten ethylene/α-olefin copolymer [C2] to perform graft copolymerization or a method of adding the unsaturated carboxylic acid or its derivative to the ethylene homopolymer [C1] or the ethylene/α-olefin copolymer [C2] each having been dissolved in a solvent to perform graft copolymerization. In each method, it is desirable to initiate the graft copolymerization reaction in the presence of a radical initiator so as to efficiently copolymerize the ethylene homopolymer [C1] or the ethylene/α-olefin copolymer [C2] with the unsaturated carboxylic acid or its derivative as the graft monomer.

Examples of the radical initiators are the same organic peroxides and organic peresters as described above for the modified ethylene/α-olefin copolymer [A2].

The radical initiator is used in an amount of usually 0.001 to 1 part by weight based on 100 parts by weight of the ethylene homopolymer [C1] or the ethylene/α-olefin copolymer [C2].

The graft reaction may be conducted in the copresence of other monomers such as styrene.

The graft modification is carried out by reacting the above components at a temperature of usually 60 to 350° C., preferably 150 to 300° C., for a period of 3 minutes to 10 hours, preferably 3 minutes to 6 hours.

In the modified ethylene homopolymer [C3] or the modified ethylene/α-olefin copolymer [C4] prepared as above, the graft quantity of the graft group derived from the unsaturated carboxylic acid or its derivative is in the range of usually 0.1 to 5.0% by weight, preferably 0.5 to 3.0% by weight. It is preferable that the graft quantity is adjusted so as to be within the range of 0.0001 to 5% by weight based on the whole adhesive ethylene copolymer resin composition of the invention.

Ethylene/Vinyl Acetate Copolymer [D]

The ethylene/vinyl acetate copolymer [D] for use in the invention has the following properties.

(i) The melt flow rate (MFR, ASTM D 1238-65T, 190° C., load of 2.16 kg) of the ethylene/vinyl acetate copolymer [D] is in the range of 0.1 to 50 g/10 min, preferably 0.3 to 30 g/10 min.

(ii) The vinyl acetate content in the ethylene/vinyl acetate copolymer [D] is in the range of 5 to 40% by weight, preferably 10 to 35% by weight.

Unmodified Linear Ethylene/α-Olefin Copolymer [E1]

The unmodified linear ethylene/α-olefin copolymer [E1] for use in the invention is a random copolymer of ethylene and an α-olefin of 3 to 20 carbon atoms.

Examples of the α-olefins of 3 to 20 carbon atoms copolymerizable with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [E1], the ethylene content is usually 55 to 99% by weight, preferably 65 to 98% by weight, more preferably 70 to 96% by weight, and the content of the α-olefin of 3 to 20 carbon atoms is usually 1 to 45% by weight, preferably 2 to 35% by weight, more preferably 4 to 30% by weight.

The composition of the ethylene/α-olefin copolymer [E1] can be determined in the same manner as described above for the ethylene/α-olefin copolymer [A1].

The ethylene/α-olefin copolymer [E1] has the following properties (i) and (ii).

(i) The density (d) is in the range of 0.900 to 0.965 g/cm$^3$, preferably 0.905 to 0.935 g/cm$^3$, more preferably 0.905 to 0.930 g/cm$^3$.

The density (d) is measured in the following manner. Strands obtained in the measurement of melt flow rate (MFR) at 190° C. under a load of 2.16 kg are heat treated at 120° C. for 1 hour and slowly cooled to room temperature over a period of 1 hour. Then, the density is measured by a gradient density tube. (ii) The melt flow rate (MFR) is in the range of 0.01 to 200 g/10 min, preferably 0.05 to 50 g/10 min, more preferably 0.1 to 10 g/10 min.

The melt flow rate (MFR) is measured under the conditions of a temperature of 190° C. and a load of 2.16 kg in accordance with ASTM D 1238-65T.

The unmodified ethylene/α-olefin copolymer [E1] for use in the invention preferably is a linear ethylene/α-olefin copolymer having the above-defined density and melt flow rate and further having the following properties (iii) to (v).

(iii) The temperature (Tm (°C.)) at the position of the maximum peak of an endotherm curve of the copolymer measured by a differential scanning calorimeter (DSC) and the density (d) satisfy the relation $$Tm < 400 \times d - 250,$$

preferably $$Tm < 450 \times d - 297,$$

more preferably $$Tm < 500 \times d - 344,$$

particularly preferably $$Tm < 550 \times d - 391.$$

The temperature (Tm (°C.)) at the maximum peak position of an endotherm curve measured by a differential scanning calorimeter (DSC) is found in an endotherm curve which is obtained by heating a sample of about 5 mg up to 200° C. at a rate of 10° C/min in an aluminum pan, maintaining the sample at 200° C. for 5 minutes, cooling it to room temperature at a rate of 20° C./min and heating it at a rate of 10° C./min. In the measurement, an apparatus of DSC-7 model manufactured by Perkin Elmer Co. was used.

(iv) The melt tension (MT (g)) and the melt flow rate (MFR) satisfy the relation $$MT \leq 2.2 \times MFR^{-0.84}.$$

The melt tension (MT (g)) is determined by measuring a stress given when a molten polymer is stretched at a constant rate in the same manner as in the measurement of MT of the ethylene/α-olefin copolymer [A1].

(v) The quantity fraction (W (% by weight)) of a decane-soluble component of the copolymer at 23° C. (room temperature) and the density (d) satisfy the relation in the case of MFR<10 g/10 min:

$$W < 80 \times \exp(-100(d-0.88)) + 0.1,$$

preferably $$W < 60 \times \exp(-100(d-0.88)) + 0.1,$$

more preferably $$W < 40 \times \exp(-100(d-0.88)) + 0.1,$$

in the case of MFR>10 g/10 min:

$$W < 80 \times (MFR-9)^{0.26} \times \exp(-100(d-0.88)) + 0.1.$$

The quantity fraction of a n-decane-soluble component is measured in the following manner. About 3 g of a copolymer is added to 450 ml of n-decane, dissolved therein at 145° C. and cooled to room temperature. Then, the n-decane-insoluble portion is removed by filtration, and the n-decane-soluble portion is recovered from the filtrate. A copolymer having a small quantity fraction of a soluble component has a narrow composition distribution.

The ethylene/α-olefin copolymer [E1], which has the above relation between the temperature (Tm) at the maximum peak position of the endotherm curve measured by a differential scanning calorimeter (DSC) and the density (d) and has the above relation between the quantity fraction (W) of the n-decane-soluble component and the density (d), shows a narrow composition distribution.

The number of the unsaturated bonds present in molecules of the ethylene/α-olefin copolymer [E1] is desirably not more than 0.5 per 1,000 carbon atoms, and it is desirably not more than 1 per one molecule of the copolymer.

The quantitative determination of the unsaturated bonds is made in the same manner as described above for the ethylene/α-olefin copolymer [A1].

The B value of the ethylene/α-olefin copolymer [E1] desirably satisfies the condition of $$1.00 \leq B,$$

preferably $$1.01 \leq B \leq 1.50,$$

more preferably $$1.01 \leq B \leq 1.30.$$

$$B = P_{OE}/2P_O \cdot P_E$$

wherein $P_E$ is a molar fraction of the ethylene component contained in the copolymer, $P_O$ is a molar fraction of the α-olefin component contained in the copolymer, and $P_{OE}$ is a proportion of the ethylene/α-olefin sequences to all the dyad sequences in the copolymer.

The meaning of the B value and the method to obtain the B vale are the same as those described above for the ethylene/α-olefin copolymer [A1].

The ethylene/α-olefin copolymer [E1] can be prepared by, for example, copolymerizing ethylene and an α-olefin of 3 to 20 carbon atoms in the presence of an olefin polymerization catalyst (a kind of "metallocene compound") formed from the below-described Group IV transition metal compound (a) containing a ligand having cyclopentadienyl skeleton, an organoaluminum oxy-compound (b), and optionally, a carrier (c) and an organoaluminum compound (d) in such a manner that the resulting copolymer has a density of 0.900 to 0.965 g/cm³.

The transition metal compound (a) used in the invention is represented by the following formula (IV):

$$ML_x \tag{IV}$$

wherein M is a transition metal atom selected from Group IVB of the periodic table, L is a ligand coordinated to the transition metal atom M, at least two of the ligands L are each a cyclopentadienyl group, a methylcyclopentadienyl group, an ethylcyclopentadienyl group or a substituted cyclopentadienyl group having at least one substituent selected from hydrocarbon groups of 3 to 10 carbon atoms, the ligand L other than the (substituted) cyclopentadienyl group is a hydrocarbon group of 1 to 12 carbon atoms, an alkoxy group, an aryloxy group, a trialkylsilyl group, a halogen atom or a hydrogen atom, and x is a valence of the transition metal atom M.

In the formula (IV), M is a transition metal atom selected from Group IVB of the periodic table, specifically, zirconium, titanium or hafnium, preferably zirconium.

L is a ligand coordinated to the transition metal atom M, and at least two of the ligands L are each a cyclopentadienyl group, a methylcyclopentadienyl group, an ethylcyclopentadienyl group or a substituted cyclopentadienyl group having at least one substituent selected from hydrocarbon groups of 3 to 10 carbon atoms. The ligand L other than the (substituted) cyclopentadienyl group is a hydrocarbon group of 1 to 12 carbon atoms, an alkoxy group, an aryloxy group, a trialkylsilyl group, a halogen atom or a hydrogen atom.

The substituted cyclopentadienyl group may have two or more substituents, and the two or more substituents may be the same as or different from each other. When the substituted cyclopentadienyl group have two or more substituents, at least one substituent is a hydrocarbon group of 3 to 10 carbon atoms, and other substituents may be each methyl, ethyl or a hydrocarbon group of 3 to 10 carbon atoms. The substituted cyclopentadienyl groups coordinated to M may be the same as or different from each other.

Examples of the hydrocarbon groups of 3 to 10 carbon atoms include alkyl groups, cycloalkyl groups, aryl groups and aralkyl groups. More specifically, there can be mentioned alkyl groups, such as n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Of these, preferable are alkyl groups, and particularly preferable are n-propyl and n-butyl.

In the present invention, the (substituted) cyclopentadienyl group coordinated to the transition metal is preferably a substituted cyclopentadienyl group, more preferably a cyclopentadienyl group substituted with an alkyl group of 3 or more carbon atoms, still more preferably a di-substituted cyclopentadienyl group, particularly preferably a 1,3-substituted cyclopentadienyl group.

In the formula (IV), the ligand L other than the substituted cyclopentadienyl group coordinated to the transition metal atom M is a hydrocarbon group of 1 to 12 carbon atoms, an alkoxy group, an aryloxy group, a trialkylsilyl group, a halogen atom or a hydrogen atom.

Examples of the hydrocarbon groups of 1 to 12 carbon atoms include alkyl groups, cycloalkyl groups, aryl groups and aralkyl groups. More specifically, there can be mentioned alkyl groups, such as methyl, ethyl, n-propyl, isopropyl, n-butyl, isobutyl, sec-butyl, t-butyl, pentyl, hexyl, octyl, 2-ethylhexyl and decyl; cycloalkyl groups, such as cyclopentyl and cyclohexyl; aryl groups, such as phenyl and tolyl; and aralkyl groups, such as benzyl and neophyl.

Examples of the alkoxy groups include methoxy, ethoxy, n-propoxy, isopropoxy, n-butoxy, isobutoxy, sec-butoxy, t-butoxy, pentoxy, hexoxy and octoxy.

Examples of the aryloxy groups include phenoxy.

Examples of the trialkylsilyl groups include trimethylsilyl, triethylsilyl and triphenylsilyl.

Examples of the halogen atoms include fluorine, chlorine, bromine and iodine.

Listed below are examples of the transition metal compounds represented by the formula (IV).

Bis(cyclopentadienyl)zirconium dichloride,
Bis(methylcyclopentadienyl)zirconium dichloride,
Bis(ethylcyclopentadienyl)zirconium dichloride,
Bis(n-propylcyclopentadienyl)zirconium dichloride,
Bis(n-butylcyclopentadienyl)zirconium dichloride,
Bis(n-hexylcyclopentadienyl)zirconium dichloride,
Bis(methyl-n-propylcyclopentadienyl)zirconium dichloride,
Bis(methyl-n-butylcyclopentadienyl)zirconium dichloride,
Bis(dimethyl-n-butylcyclopentadienyl)zirconium dichloride,
Bis(n-butylcyclopentadienyl)zirconium dibromide,
Bis(n-butylcyclopentadienyl)zirconium methoxychloride,
Bis(n-butylcyclopentadienyl)zirconium ethoxychloride,
Bis(n-butylcyclopentadienyl)zirconium butoxychloride, Bis(n-butylcyclopentadienyl)zirconium ethoxide,
Bis(n-butylcyclopentadienyl)zirconium methylchloride,
Bis(n-butylcyclopentadienyl)zirconium dimethyl,
Bis(n-butylcyclopentadienyl)zirconium benzylchloride,
Bis(n-butylcyclopentadienyl)zirconium dibenzyl,
Bis(n-butylcyclopentadienyl)zirconium phenylchloride,
Bis(n-butylcyclopentadienyl)zirconium hydride chloride,
Bis(1-methyl-3-n-propylcyclopentadienyl)zirconium dichloride, and
Bis(1-methyl-3-n-butylcyclopentadienyl)zirconium dichloride.

In the above examples, the di-substituted cyclopentadienyl rings include 1,2-substituted cyclopentadienyl rings and 1,3-substituted cyclopentadienyl rings. The tri-substituted cyclopentadienyl rings include 1,2,3-substituted cyclopentadienyl rings and 1,2,4-substituted cyclopentadienyl rings.

Also employable are transition metal compounds wherein zirconium is replaced with titanium or hafnium in the above-exemplified zirconium compounds.

Of the transition metal compounds represented by the formula (IV), particularly preferable are:
bis(n-propylcyclopentadienyl)zirconium dichloride,
bis(n-butylcyclopentadienyl)zirconium dichloride,
bis(1-methyl-3-n-propylcyclopentadienyl)zirconium dichloride, and
bis(1-methyl-3-n-butylcyclopentadienyl)zirconium dichloride.

Next, the organoaluminum oxy-compound (b) is described.

The organoaluminum oxy-compound (b) for forming the olefin polymerization catalyst used in the preparation of the unmodified ethylene/α-olefin copolymer [E1] may be a benzene-soluble aluminoxane conventionally known or a benzene-insoluble organoaluminum oxy-compound disclosed in Japanese Patent Laid-Open Publication No. 276807/1990. Details of the organoaluminum oxy-compound (b) are as described above in the preparation of the unmodified ethylene/x-olefin copolymer [A1].

The catalyst used in the invention is formed from the metallocene type transition metal compound (a) and the organoaluminum oxy-compound (b), but if necessary, a carrier (c) and an organoaluminum compound (d) may be further used to form the catalyst.

Details of the carrier (c) and the organoaluminum compound (d) are as described above in the preparation of the unmodified ethylene/α-olefin copolymer [A1].

The olefin polymerization catalyst used for preparing the ethylene/α-olefin copolymer [E1] is prepared by contacting the metallocene type transition metal compound, (a) with the organoaluminum oxy-compound (b), and optionally, the carrier (c) and the organoaluminum compound (d).

The components (a) to (d) may be contacted in any order, but preferably the carrier (c) is first contacted with the organoaluminum oxy-compound (b), then with the transition metal compound (a), and then if necessary, with the organoaluminum compound (d).

The contact of the components (a) to (d) can be carried out in an inert hydrocarbon solvent. Examples of the inert hydrocarbon solvents used for preparing the catalyst include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons.

In the contact of the transition metal compound (a), the organoaluminum oxy-compound (b), the carrier (c) and the organoaluminum compound (d), the transition metal compound (a) is used in an amount of usually $5\times10^{-6}$ to $5\times10^{-4}$ mol, preferably $10^{-5}$ to $2\times10^{-4}$ mol, based on 1 g of the carrier (c), and the concentration of the transition metal compound (a) is in the range of about $10^{-4}$ to $2\times10^{-2}$ mol/liter, preferably $2\times10^{-4}$ to $10^{-2}$ mol/liter. The atomic ratio (Al/transition metal) of aluminum in the organoaluminum oxy-compound (b) to the transition metal in the transition metal compound (a) is usually 10 to 500, preferably 20 to 200. The atomic ratio (Al-d/Al-b) of the aluminum atom (Al-d) in the optionally used organoaluminum compound (d) to the aluminum atom (Al-b) in the organoaluminum oxy-compound (b) is usually 0.02 to 3, preferably 0.05 to 1.5. These catalyst components are contacted at a temperature of usually −50 to 150° C., preferably −20 to 120° C., for a period of 1 minute to 50 hours, preferably 10 minutes to 25 hours.

In the olefin polymerization catalyst, it is desired that the transition metal atom derived from the transition metal compound (a) is supported in an amount of $5\times10^{-6}$ to $5\times10^{-4}$ g·atom, preferably $10^{-5}$ to $2\times10^{-4}$ g·atom, based on 1 g of the carrier, and the aluminum atom derived from the organoaluminum oxy-compound (b) and the organoaluminum compound (d) is supported in an amount of $10^{-3}$ to $5\times10^{-2}$ g·atom, preferably $2\times10^{-3}$ to $2\times10^{-2}$ g·atom, based on 1 g of the carrier (c).

The catalyst used for preparing the ethylene/α-olefin copolymer [E1] may be a prepolymerized catalyst obtained by prepolymerizing an olefin in the presence of the transition metal compound (a), the organoaluminum oxy-compound (b), the carrier (c), and optionally, the organoaluminum compound (d).

The prepolymerization can be carried out by introducing an olefin into an inert hydrocarbon solvent in the presence of the prepolymerized catalyst components.

Examples of the olefins used in the prepolymerization include ethylene and α-olefins of 3 to 20 carbon atoms such as propylene, 1-butene, 1-pentene, 4-methyl-1-pentene, 1-hexene, 1-octene, 1-decene, 1-dodecene and 1-tetradecene. Of these, particularly preferable is ethylene, which is used in the polymerization, or a combination of ethylene and the α-olefin.

In the prepolymerization, the concentration of the transition metal compound (a) is in the range of usually $10^{-6}$ to $2\times10^{-2}$ mol/liter, preferably $5\times10^{-5}$ to $10^{-2}$ mol/liter, and the transition metal compound (a) is used in an amount of usually $5\times10^{-6}$ to $5\times10^{-4}$ mol, preferably $10^{-5}$ to $2\times10^{-4}$ mol, based on 1 g of the carrier (c). The atomic ratio (Al/transition metal) of aluminum in the organoaluminum oxy-compound (b) to the transition metal in the transition metal compound (a) is usually 10 to 500, preferably 20 to 200. The atomic ratio (Al-d/Al-b) of the aluminum atom (Al-d) in the optionally used organoaluminum compound (d) to the aluminum atom (Al-b) in the organoaluminum oxy-compound (b) is usually 0.02 to 3, preferably 0.05 to 1.5. The prepolymerization temperature is −20 to 80° C., preferably 0 to 60° C., and the prepolymerization time is 0.5 to 100 hours, preferably 1 to 50 hours.

The prepolymerized catalyst is prepared by, for example, the following process. The carrier (c) is suspended in an inert hydrocarbon solvent. To the resulting suspension is added the organoaluminum oxy-compound (b) to react them for a given period of time. Then, the supernatant liquid is removed, and the resulting solid is resuspended in an inert hydrocarbon solvent. To the system, the transition metal compound (a) is added to perform reaction for a given period of time. Then, the supernatant liquid is removed to obtain a solid catalyst component. The solid catalyst component is added to an inert hydrocarbon solution of the organoaluminum compound (d), and thereto is introduced an olefin to obtain a prepolymerized catalyst.

The amount of an olefin polymer produced in the prepolymerization is desirably 0.1 to 500 g, preferably 0.2 to 300 g, more preferably 0.5 to 200 g, based on 1 g of the carrier (c). In the prepolymerized catalyst, it is desired that the transition metal atom (a) is supported in an amount of $5 \times 10^{-6}$ to $5 \times 10^{-4}$ g·atom, preferably $10^{-5}$ to $2 \times 10^{-4}$ g·atom, in terms of the transition metal atom, based on 1 g of the carrier (c), and the aluminum atom (Al) derived from the organoaluminum oxy-compound (b) and the organoaluminum compound (d) is supported in such an amount that the molar ratio (Al/M) of the aluminum atom (Al) to the transition metal atom (M) derived from the transition metal compound (a) is 5 to 200, preferably 10 to 150.

The prepolymerization can be carried out by any of batchwise and continuous processes, and it can be carried out under reduced pressure, atmospheric pressure or pressure. In the prepolymerization, it is desired that a prepolymer having an intrinsic viscosity [η], as measured in decalin at 135° C., of 0.2 to 7 dl/g, preferably 0.5 to 5 dl/g, is produced by allowing hydrogen to coexist in the system.

The unmodified ethylene/α-olefin copolymer [E1] for use in the invention is obtained by copolymerizing ethylene and an α-olefin of 3 to 20 carbon atoms in the presence of the catalyst mentioned above.

The copolymerization of ethylene and the α-olefin is carried out in a gas phase or a liquid phase such as slurry. In the slurry polymerization, an inert hydrocarbon may be used as a solvent or the olefin itself may be used as the solvent.

Examples of the inert hydrocarbon solvents used in the slurry polymerization include aliphatic hydrocarbons, such as butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as gasoline, kerosine and gas oil. Of these inert hydrocarbon media, preferable are aliphatic hydrocarbons, alicyclic hydrocarbons and petroleum fractions.

In the slurry polymerization or the gas phase polymerization, the catalyst is desirably used in such an amount that the concentration of the transition metal atom in the polymerization reaction system is usually $10^{-8}$ to $10^{-3}$ g·atom/liter, preferably $10^{-7}$ to $10^{-4}$ g·atom/liter.

In the polymerization, the same organoaluminum oxy-compound as the organoaluminum oxy-compound (b) and/or the organoaluminum compound (d) may be added. In this case, the atomic ratio (Al/M) of the aluminum atom (Al) derived from the organoaluminum oxy-compound and the organoaluminum compound to the transition metal atom (M) derived from the transition metal compound (a) is 5 to 300, preferably 10 to 200, more preferably 15 to 150.

In the slurry polymerization, the polymerization temperature is in the range of usually −50 to 100° C., preferably 0 to 90° C. In the gas phase polymerization, the polymerization temperature is in the range of usually 0 to 120° C., preferably 20 to 100° C.

The polymerization pressure is in the range of usually atmospheric pressure to 100 kg/cm$^2$, preferably 2 to 50 kg/cm$^2$. The polymerization can be carried out by any of batchwise, semi-continuous and continuous processes.

Further, the polymerization may be conducted in two or more stages under different reaction conditions.

Modified Ethylene/α-Olefin Copolymer [E2]

The modified ethylene/α-olefin copolymer [E2] for use in the invention is obtained by grafting an unsaturated carboxylic acid or its derivative on the above-described ethylene/α-olefin copolymer [E1].

Examples of the unsaturated carboxylic acids and their derivatives include unsaturated carboxylic acids, such as acrylic acid, methacrylic acid, α-ethylacrylic acid, maleic acid, fumaric acid, itaconic acid, citraconic acid, tetrahydrophthalic acid, methyltetrahydrophthalic acid and endo-cis-bicyclo[2,2,1]-hepto-5-ene-2,3-dicarboxylic acid (Nadic acid™); and derivatives, such as acid halides, amides, imides, anhydrides and esters of the unsaturated carboxylic acids. Of these, preferable are unsaturated dicarboxylic acids and anhydrides thereof, and particularly preferable are maleic acid, Nadic acids and anhydrides thereof.

The graft modification can be carried out by conventional methods. For example, the ethylene/α-olefin copolymer [E1] is dissolved in an organic solvent, and to the resulting solution is added the unsaturated carboxylic acid or its derivative, a radical initiator, etc. to perform reaction at 70 to 200° C., preferably 80 to 190° C. for 0.5 to 15 hours, preferably 1 to 10 hours.

As the organic solvent, various organic solvents are employable without any specific limitation, as far as they can dissolve the ethylene/α-olefin copolymer [E1].

Examples of the organic solvents include aromatic hydrocarbon solvents, such as benzene, toluene and xylene; and aliphatic hydrocarbon solvents, such as pentane, hexane and heptane.

The graft modified ethylene/α-olefin copolymer [E2] may be prepared by reacting the ethylene/α-olefin copolymer [E1] with the unsaturated carboxylic acid or its derivative in the absence of a solvent using an extruder or the like. In this case, the reaction temperature is usually not lower than the melting point of the ethylene/α-olefin copolymer [E1], specifically 120 to 250° C. The reaction time under such temperature conditions is usually 0.5 to 10 minutes.

In any of the conventional graft modification methods, the reaction is preferably carried out in the presence of a radical initiator so as to efficiently graft copolymerize the ethylene/α-olefin copolymer [E1] with the unsaturated carboxylic acid or its derivative as the graft monomer.

Examples of the radical initiators are as described above for the modified ethylene/α-olefin copolymer [A2].

The radical initiator is used in an amount of usually 0.001 to 1 part by weight based on 100 parts by weight of the ethylene/α-olefin copolymer [E1].

The graft reaction is carried out at a temperature of usually 60 to 350° C.

In the modified ethylene/α-olefin copolymer [E2] prepared as above, the graft quantity of the graft group derived from the unsaturated carboxylic acid or its derivative is in the range of usually 0.01 to 20% by weight, preferably 0.05 to 10% by weight, more preferably 0.1 to 5% by weight.

Olefin Elastomer [F]

The olefin elastomer [F] for use in the invention is a (co)polymer of ethylene and/or an α-olefin having 3 to 20 carbon atoms, and desirably has a density of 0.850 to 0.895 g/cm$^3$, preferably 0.860 to 0.890 g/cm$^3$, and a melt flow rate (MFR, ASTM D 1238-65T, 190° C., load of 2.16 kg) of 0.01 to 200 g/10 min, preferably 0.01 to 100 g/10 min, more preferably 0.05 to 50 g/10 min. Further, the olefin elastomer [F] desirably has a crystallinity, as measured by X-ray diffractometry, of less than 30% or is amorphous.

Examples of the α-olefins of 3 to 20 carbon atoms include propylene, 1-butene, 1-pentene, 1-hexene, 4-methyl-1-pentene, 1-octene, 1-decene and mixtures thereof. Of these, particularly preferable are α-olefins of 3 to 10 carbon atoms.

In the olefin elastomer [F] for use in the invention, other constituent units than those derived from α-olefin, such as constituent units derived from diene compounds, may be contained, so far as the properties of the olefin elastomer are not marred.

Examples of the constituent units allowed to be contained in the olefin elastomer [F] include:

constituent units derived from chain non-conjugated dienes, such as 1,4-hexadiene, 1,6-octadiene, 2-methyl-1,5-hexadiene, 6-methyl-1,5-heptadiene and 7-methyl-1,6-octadiene;

constituent units derived from cyclic non-conjugated dienes, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and constituent units derived from other diene compounds, such as 2,3-diisopropylidene-5-norbornene, 2-ethylidene-3-isopropylidene-5-norbornene and 2-propenyl-2,2-norbornadiene.

These diene compounds may be used singly or in combination. The constituent units derived from these diene compounds are contained in amounts of usually not more than 10% by mol, preferably 0 to 5% by mol.

The olefin elastomer [F] is, for example, a copolymer (ethylene copolymer, α-olefin copolymer) containing constituent units derived from ethylene in amounts of 0 to 95% by mol, preferably 30 to 92% by mol, more preferably 50 to 90% by mol, particularly preferably 75 to 95% by mol, constituent units derived from an α-olefin of 3 to 20 carbon atoms in amounts of 1 to 100% by mol, preferably 4 to 70% by mol, more preferably 8 to 50% by mol, particularly preferably 10 to 40% by mol, and constituent units derived from the diene component in amounts of 0 to 10% by mol, preferably 0 to 5% by mol, more preferably 0 to 3% by mol, particularly preferably 0 to 2.5% by mol.

The olefin elastomer [F) can be prepared by a known process using a catalyst of Ti type, V type or Zr type.

Adhesive Ethylene Copolymer Resin Composition

The first adhesive ethylene copolymer resin composition according to the invention comprises:

the modified ethylene/α-olefin copolymer [A2], or the unmodified long-chain branched ethylene/α-olefin copolymer [A1] and the modified ethylene/α-olefin copolymer [A2], in an amount of 50 to 99% by weight, preferably 60 to 95% by weight, more preferably 70 to 95% by weight, and the tackifier [B] in an amount of 1 to 50% by weight, preferably 5 to 40% by weight, more preferably 5 to 30% by weight. The total amount of the components [A1], [A2] and [B] is 100% by weight.

The first adhesive ethylene copolymer resin composition of the invention has the following properties:

the density (d) is in the range of preferably 0.870 to 0.900 g/cm$^3$, the melt flow rate (MFR) at 190° C. under a load of 2.16 kg is in the range of preferably 0.1 to 100 g/10 min, more preferably 0.5 to 50 g/10 min, the crystallinity, as measured by X-ray diffractometry, is less than 40%, preferably less than 30%, and the graft quantity based on the total amount of the composition is in the range of 0.0001 to 5% by weight.

The second adhesive ethylene copolymer resin composition according to the invention comprises:

at least one component selected from the group consisting of the unmodified long-chain branched ethylene/x-olefin copolymer [A1] and the modified ethylene/α-olefin copolymer [A2], in an amount of 49 to 95% by weight, preferably 58 to 95% by weight, more preferably 67 to 92% by weight, the tackifier [B3 in an amount of 1 to 50% by weight, preferably 3 to 40% by weight, more preferably 5 to 30% by weight, and at least one component selected from the group consisting of the ethylene homopolymer [C1], the ethylene/α-olefin copolymer [C2], the modified ethylene homopolymer [C3] and the modified ethylene/α-olefin copolymer [C4], in an amount of 1 to 30% by weight, preferably 2 to 25% by weight, more preferably 3 to 20% by weight, said composition containing at least one component selected from the group consisting of the modified ethylene/α-olefin copolymer [A2], the modified ethylene homopolymer [C3] and the modified ethylene/α-olefin copolymer [C4]. The total amount of the components [A1], [A2], [B], [C1], [C2], [C3] and [C4] is 100% by weight.

The second adhesive ethylene copolymer resin composition of the invention has the following properties:

the density (d) is in the range of preferably 0.870 to 0.900 g/cm$^3$, the melt flow rate (MFR) at 190° C. under a load of 2.16 kg is in the range of preferably 0.1 to 100 g/10 min, more preferably 0.5 to 50 g/10 min, the crystallinity, as measured by X-ray diffractometry, is less than 40%, preferably less than 30%, and the graft quantity based on the total amount of the composition is in the range of 0.0001 to 5% by weight.

The third adhesive ethylene copolymer resin composition according to the invention comprises:

the modified ethylene/α-olefin copolymer [A2], or the unmodified long-chain branched ethylene/α-olefin copolymer [A1] and the modified ethylene/α-olefin copolymer (A2], in an amount of 50 to 95% by weight, preferably 65 to 90% by weight, and the ethylene/vinyl acetate copolymer [D] in an amount of 5 to 50% by weight, preferably 10 to 35% by weight. The total amount of the components [A1], [A2] and [D] is 100% by weight.

The third adhesive ethylene copolymer resin composition of the invention has the following properties:

the density (d) is in the range of preferably 0.870 to 0.900 g/cm$^3$, the melt flow rate (MFR) at 190° C. under a load of 2.16 kg is in the range of preferably 0.1 to 100 g/10 min, more preferably 0.5 to 50 g/10 min, the crystallinity, as measured by X-ray diffractometry, is less than 30%, and the graft quantity based on the total amount of the composition is in the range of 0.0001 to 5% by weight.

The fourth adhesive ethylene copolymer resin composition according to the invention comprises:

at least one component selected from the group consisting of the umodified long-chain branched ethylene/α-olefin copolymer [A1] and the modified ethylene/α-olefin copolymer (A2], in an amount of 50 to 95% by weight, preferably 55 to 90% by weight, more preferably 60 to 90% by weight, the ethylene/vinyl acetate copolymer [D] in an amount of 4 to 40% by weight, preferably 5 to 35% by weight, more preferably 7 to 30% by weight, and at least one component selected from the group consisting of the ethylene homopolymer [C1], the ethylene/α-olefin copolymer [C2], the modified ethylene homopolymer [C3] and the modified ethylene/α-olefin copolymer [C4], in an amount of 1 to 30% by weight, preferably 2 to 25% by weight, more preferably 3 to 20% by weight, said composition containing at least one component selected from the group consisting of the modified ethylene/α-olefin copolymer [A2], the modified ethylene homopolymer [C3] and the modified ethylene/α-olefin copolymer [C4]. The total amount of the components [A1], [A2], [D], [C1], [C2], [C3] and [C4] is 100% by weight.

The fourth adhesive ethylene copolymer resin composition of the invention has the following properties:

the density (d) is in the range of preferably 0.870 to 0.900 g/cm$^3$, the melt flow rate (MFR) at 190° C. under a load of 2.16 kg is in the range of preferably 0.1 to 100 g/10 min, more preferably 0.5 to 50 g/10 min, the crystallinity, as measured by X-ray diffractometry, is less than 30%, and the graft quantity based on the total amount of the composition is in the range of 0.0001 to 5% by weight.

The fifth adhesive ethylene copolymer resin composition according to the invention comprises a blend of the modified ethylene/α-olefin copolymer [E2] and the olefin elastomer [F], or comprises a blend of the unmodified ethylene/α-olefin copolymer [E1], the modified ethylene/α-olefin copolymer [E2] and the olefin elastomer [F].

The modified ethylene/α-olefin copolymer [E2] is used in an amount of 50 to 95% by weight, preferably 60 to 90% by weight, more preferably 65 to 85% by weight, based on 100% by weight of the total amount of the modified ethylene/x-olefin copolymer [E2] and the olefin elastomer [F].

The unmodified ethylene/α-olefin copolymer [E1] can be used in place of a part of the modified ethylene/α-olefin copolymer [E2], within limits not prejudicial to the objects of the invention.

The olefin elastomer [F] is used in an amount of 5 ' to 50% by weight, preferably 10 to 40% by weight, more preferably 15 to 35% by weight, based on 100% by weight of the total amount of the modified ethylene/α-olefin copolymer [E2] (or the unmodified ethylene/α-olefin copolymer [E1] and the modified ethylene/α-olefin copolymer [E2]) and the olefin elastomer [F].

The blend desirably has the following properties:

the density (d) is in the range of preferably 0.870 to 0.960 g/cm$^3$, more preferably 0.880 to 0.930 g/cm$^3$, particularly preferably 0.900 to 0.920 g/cm$^3$, the melt flow rate (MFR) at 190° C. under a load of 2.16 kg is in the range of preferably 0.01 to 100 g/10 min, more preferably 0.05 to 50 g/10 min, particularly preferably 0.1 to 20 g/10 min, the graft quantity of the graft group derived from the unsaturated carboxylic acid or its derivative is in the range of preferably 0.01 to 5% by weight, more preferably 0.03 to 3% by weight, particularly preferably 0.05 to 0.5% by weight, and the crystallinity, as measured by X-ray diffractometry, is not less than 15%, more preferably 20 to 70%, particularly preferably 30 to 60%.

The adhesive ethylene copolymer resin compositions of the invention can be obtained by processes conventionally known, such as a process comprising mixing the above components using a Henschel mixer, a V-blender, a ribbon blender, a tumbling blender or the like, and a process comprising mixing the above components and melt kneading the resulting mixture using a single-screw extruder, a twin-screw extruder, a kneader, a Banbury mixer or the like, followed by granulating the kneadate or pulverizing the resin mass.

To the adhesive ethylene copolymer resin compositions of the invention, various additives, such as weathering stabilizer, heat stabilizer, antistatic agent, anti-slip agent, anti-blocking agent, anti-fogging agent, lubricant, pigment, dye, anti-corrosive agent, nucleating agent, plasticizer, anti-aging agent, hydrochloric acid absorber and antioxidant, may be added in addition to the above components, within limits not prejudicial to the objects of the invention.

Laminate

The first laminate according to the invention is a laminate having a layer structure of three layers or a layer structure of four or more layers including said three layers, said three-layer structure being formed by superposing a resin selected from the group consisting of a polystyrene resin, an ABS resin and a polyacrylonitrile resin, the aforesaid first or second adhesive ethylene copolymer resin composition of the invention and an ethylene/vinyl acetate copolymer saponified resin (EVOH) upon each other in this order in a molten state and cooling those resins.

Examples of the polystyrene resins include polystyrene, high-impact polystyrene (rubber blended polystyrene) and AS resin (styrene/acrylonitrile copolymer (SAN)).

Examples of the ethylene/vinyl acetate copolymer saponified resins (EVOH) include a resin obtained by saponifying an ethylene/vinyl acetate copolymer having an ethylene content of 15 to 60% by mol,. preferably 25 to 50% by mol in such a manner that the resulting saponified resin has a saponification degree of not less than 50%, preferably not less than 90%.

There is no specific limitation on the structure of the first laminate of the invention, as far as the aforesaid first or second adhesive ethylene copolymer resin composition is employed. If desired, there can be used polyolefin that is compatible with the adhesive ethylene copolymer resin composition or polyamide that is adherable to the ethylene/vinyl acetate copolymer saponified resin (EVOH). For example, the following layer structures are available.

(i) A laminate of three-layer structure consisting of a polystyrene resin layer, an adhesive ethylene copolymer resin composition layer and an EVOH layer.

(ii) A laminate of five-layer structure consisting of a polystyrene resin layer, an adhesive ethylene copolymer resin composition layer, an EVOH layer, an adhesive ethylene copolymer resin composition layer and a polystyrene resin layer.

(iii) A laminate of five-layer structure consisting of a polystyrene resin layer, an adhesive ethylene copolymer resin composition layer, an EVOH layer, an adhesive ethylene copolymer resin composition layer and a polyethylene layer.

(iv) A laminate of six-layer structure consisting of a polystyrene resin layer, an adhesive ethylene copolymer resin composition layer, an EVOH layer, a polyamide layer, an adhesive ethylene copolymer resin composition layer and a polyethylene layer.

(v) A multi-layer laminate having, as a part of the layer structure, a layer of polystyrene, ABS resin or polyacrylonitrile/an adhesive ethylene copolymer resin composition layer/an EVOH layer.

Any of the layers for forming these laminates may be monoaxially or biaxially orientated.

In the first laminate of the invention, the thickness of the layer of the polystyrene resin, the ABS resin or the polyacrylonitrile resin is in the range of 0.02 to 5 mm; the thickness of the adhesive ethylene copolymer resin composition layer is in the range of 0.01 to 1 mm; and the thickness of the ethylene/vinyl acetate copolymer saponified resin (EVOH) layer is in the range of 0.01 to 1 mm.

The first laminate of the invention can be produced by a conventional laminating method, for example, a co-extrusion laminating method.

The second laminate according to the invention is a laminate having a layer structure of three layers or a layer structure of four or more layers including said three layers, said three-layer structure being formed by superposing a resin selected from the group consisting of a polyester resin, a polycarbonate resin and a polyvinylidene chloride resin, the aforesaid third or fourth adhesive ethylene copolymer resin composition and an ethylene/vinyl acetate copolymer saponified resin (EVOH) upon each other in this order in a molten state and cooling those resins.

The polyester resin is a thermoplastic polyester composed of constituent units derived from one or more dihydroxy compounds selected from aliphatic glycols, such as ethylene glycol, propylene glycol, 1,4-butanediol, neopentyl glycol and hexamethylene glycol, alicyclic glycols, such as cyclohexanedimethanol, and aromatic dihydroxy compounds, such as bisphenol; and constituent units derived from one or more dicarboxylic acids selected from aromatic dicarboxylic acids, such as terephthalic acid, isophthalic acid and 2,6-naphthalenedicarboxylic acid, aliphatic dicarboxylic acids, such as oxalic acid, succinic acid, adipic acid, sebacic acid and undecanedicarboxylic acid, and alicyclic dicarboxylic acids, such as hexahydroterephthalic acid. The polyester resin may be modified with a small amount of a polyhydroxy compound or a polycarboxylic acid each having 3 or more valences, such as triol or tricarboxylic acid.

Examples of the thermoplastic polyesters include polyethylene terephthalate, polybutylene terephthalate and a polyethylene isophthalate/terephthalate copolymer.

As the polycarbonate resins, various polycarbonates obtained by reacting dihydroxy compounds with phosgene or diphenyl carbonate in a conventional way are employable.

Examples of the dihydroxy compounds include hydroquinone, resorcinol, 4,4'-dihydroxydiphenylmethane, 4,4'-dihydroxydiphenylethane, 4,4'-dihydroxydiphenylbutane, 4,4'-dihydroxydiphenylheptane, 4,4'-dihydroxydiphenylphenylmethane, 4,4'-dihydroxydiphenyl-2,2-propane (bisphenol A), 4,4'-dihydroxy-3,3-dimethyldiphenyl-2,2-propane, 4,4'-dihydroxydichlorodiphenyl-2,2-propane, 4,4'-dihydroxydiphenyl-1,1-cyclohexane, 4,4'-dihydroxydiphenylmethylphenylmethane, 4,4'-dihydroxydiphenylethylphenylmethane, 4,4'-dihydroxydiphenyl-2,2,2-trichloro-1,1-ethane, 2,2'-dihydroxydiphenyl, 2,6-dihydroxynaphthalene, 4,4'-dihydroxydiphenyl ether, 4,4'-dihydroxy-3,3'-dichlorodiphenyl ether and 4,4'-dihydroxy-2,5'-diethoxyphenyl ether.

Of these dihydroxy compounds, 4,4'-dihydroxydiphenyl-2,2-propane (bisphenol A) is preferable because the resulting polycarbonate exhibits excellent mechanical properties and transparency.

The polyvinylidene chloride resin employable herein is, for example, a copolymer of not less than 50% by weight of vinylidene chloride and either acrylonitrile, vinyl chloride, acrylic ester or methacrylic ester.

As the ethylene/vinyl acetate copolymer saponified resin (EVOH), the same resin as used in the above-mentioned first laminate of the invention is employable.

There is no specific limitation on the structure of the second laminate of the invention, as far as the aforesaid third or fourth adhesive ethylene copolymer resin composition is employed. If desired, there can be used polyolefin that is compatible with the adhesive ethylene copolymer resin composition or polyamide that is adherable to the ethylene/vinyl acetate copolymer saponified resin (EVOH). For example, the following layer structures are available.

(i) A laminate of three-layer structure consisting of a polyester resin layer, an adhesive ethylene copolymer resin composition layer and an EVOH layer.

(ii) A laminate of five-layer structure consisting of a polyester resin layer, an adhesive ethylene copolymer resin composition layer, an EVOH layer, an adhesive ethylene copolymer resin composition layer and a polyester resin layer.

(iii) A laminate of five-layer structure consisting of a polyester resin layer, an adhesive ethylene copolymer resin composition layer, an EVOH layer, an adhesive ethylene copolymer resin composition layer and a polyethylene layer.

(iv) A laminate of six-layer structure consisting of a polyester resin layer, an adhesive ethylene copolymer resin composition layer, an EVOH layer, a polyamide layer, an adhesive ethylene copolymer resin composition layer and a polyethylene layer.

(v) A laminate wherein the polyester resin layer is replaced with a polycarbonate resin layer or a polyvinylidene chloride resin layer in any of the above-mentioned laminates (i) to (iv).

(vi) A multi-layer laminate having, as a part of the layer structure, a layer of polyester, polycarbonate resin or polyvinylidene chloride resin/an adhesive ethylene copolymer resin composition layer/an EVOH layer.

Any of the layers for forming these laminates may be monoaxially or biaxially orientated.

In the second laminate of the invention, the thickness of the layer of the polyester resin, the polycarbonate resin or the polyvinylidene chloride resin is in the range of 0.02 to 5 mm; the thickness of the adhesive ethylene copolymer resin composition layer is in the range of 0.01 to 1 mm; and the thickness of the ethylene/vinyl acetate copolymer saponified resin (EVOH) layer is in the range of 0.01 to 1 mm.

The second laminate of the invention can be produced by a conventional laminating method, for example, a co-extrusion laminating method.

The third laminate according to the invention comprises a layer of the aforesaid fifth adhesive ethylene copolymer resin composition and a layer of a polar material or a metal.

Examples of the polar materials preferably used herein include ethylene/vinyl alcohol copolymers, polyamides (nylon) and polyesters.

The metal is usually a metal foil, and examples of the metals include aluminum, iron and copper.

Described below are some embodiments of the third laminate according to the invention.

(A) A laminate of multi-layer structure comprising an adhesive ethylene copolymer resin composition layer and either a nylon layer or an ethylene/vinyl alcohol copolymer layer.

More specifically, the following ones are available.

(i) A laminate of two-layer structure consisting of an adhesive ethylene copolymer resin composition layer and either a nylon layer or an ethylene/vinyl alcohol copolymer layer, as an inside layer and an outside layer, respectively (or as an outside layer and an inside layer, respectively).

(ii) A laminate of three-layer structure consisting of an adhesive ethylene copolymer resin composition layer, a nylon layer and an ethylene/vinyl alcohol copolymer layer, one of said layers being an intermediate layer and the other layers being an outside layer and an inside layer.

(iii) A laminate of multi-layer structure wherein a polymer layer having adhesion properties to any of the adhesive ethylene copolymer resin composition layer, the nylon layer and the ethylene/vinyl alcohol copolymer layer is further provided in the above-mentioned laminate (i) or (ii) For example, a layer of polypropylene, polyethylene or an ethylene/α-olefin copolymer is given as the polymer layer to be laminated on the adhesive ethylene copolymer resin composition layer; a layer of an ethylene/vinyl alcohol copolymer is given as the polymer layer to be laminated on the nylon layer; and a layer of nylon or polyester is given as the polymer layer to be laminated on the ethylene/vinyl alcohol copolymer layer.

Particular examples of the laminates (iii) of the multi-layer structure include:

a laminate of three-layer structure of a polyethylene layer/an adhesive ethylene copolymer resin composition layer/a nylon layer or an ethylene/vinyl alcohol copolymer layer, a laminate of three-layer structure of an adhesive ethylene copolymer resin composition layer/an ethylene/vinyl alcohol copolymer layer/a nylon layer, a laminate of three-layer structure of an adhesive ethylene copolymer resin composition layer/a nylon layer/an ethylene/vinyl alcohol copolymer layer, a laminate of four-layer structure of a polyethylene layer/ an adhesive ethylene copolymer resin composition layer/a nylon layer or an ethylene/vinyl alcohol copolymer layer/an adhesive ethylene copolymer resin composition layer, a laminate of four-layer structure of a polyethylene layer/ an adhesive ethylene copolymer resin composition layer/an ethylene/vinyl alcohol copolymer layer/a nylon layer, a laminate of four-layer structure of a polyethylene layer/ an adhesive ethylene copolymer resin composition layer/a nylon layer/an ethylene/vinyl alcohol copolymer layer, and a laminate of five-layer structure of a polyethylene layer/ an adhesive ethylene copolymer resin composition layer/a nylon layer or an ethylene/vinyl alcohol copolymer layer/an adhesive ethylene copolymer resin composition layer/a polyethylene layer.

Also available is a multi-layer laminate having, as a part of the layer structure, an adhesive ethylene copolymer resin composition layer/a nylon layer or an ethylene/vinyl alcohol copolymer layer.

Any of the layers for forming these laminates may be monoaxially or biaxially orientated.

(B) A laminate of multi-layer structure comprising an adhesive ethylene copolymer resin composition layer and a metal foil.

More specifically, the following ones are available.

(i) A laminate of two-layer structure of an adhesive ethylene copolymer resin composition layer/a metal foil.

(ii) A laminate of three-layer structure of a polyethylene layer/an adhesive ethylene copolymer resin composition layer/a metal foil.

(iii) A laminate of four-layer structure of a polyethylene layer/an adhesive ethylene copolymer resin composition layer/a metal foil/an adhesive ethylene copolymer resin composition layer.

(iv) A laminate of multi-layer structure having, as a part of the layer structure, an adhesive ethylene copolymer resin composition layer/a metal foil.

The third laminate of the invention can be produced by a conventional laminating method, for example, a co-extrusion laminating method, an extrusion coating method or a thermal laminating method.

EFFECT OF THE INVENTION

The first and the second adhesive ethylene copolymer resin compositions according to the invention have good adhesive force to polystyrene resins, ABS resin, polyacrylonitrile resins and ethylene/vinyl acetate copolymer saponified resins even in an atmosphere of high temperatures.

Therefore, the first laminate of the invention, which has a layer of the first or the second adhesive ethylene copolymer resin composition, shows good adhesive force to the polystyrene resins, ABS resin, polyacrylonitrile resins and the ethylene/vinyl acetate copolymer saponified resins even in an atmosphere of high temperatures.

The first laminate of the invention has good moldability, that is a feature of the polystyrene resins, ABS resin and polyacrylonitrile resins, and has high gas barrier property, that is a feature of the ethylene/vinyl acetate copolymer saponified resins. Hence, this laminate can be suitably used for deep draws having high resistance to permeation of gases, and can be used as a packaging material for foods and medicaments.

The third and the fourth adhesive ethylene copolymer resin compositions according to the invention have good adhesive force to polyester resins, polycarbonate resins, polyvinylidene chloride resins and ethylene/vinyl acetate copolymer saponified resins even in an atmosphere of high temperatures.

Therefore, the second laminate according to the invention, which has a layer of the third or the fourth adhesive ethylene copolymer resin composition, shows good adhesive force to the polyester resins, polycarbonate resins, polyvinylidene chloride resins and ethylene/vinyl acetate copolymer saponified resins even in an atmosphere of high temperatures.

The second laminate of the invention has good mechanical strength, that is a feature of the polyester resins, polycarbonate resins and polyvinylidene chloride resins, and has high gas barrier property, that is a feature of the ethylene/ vinyl acetate copolymer saponified resins. Hence, this laminate can be suitably used for films, bottles, etc. having high resistance to permeation of gases, and can be used as a packaging material for foods and medicaments.

The fifth adhesive ethylene copolymer resin composition according to the invention shows excellent heat stability and moldability, and it can form a film layer having high transparency and good adhesion to metals or materials of high polarity.

The third laminate according to the invention is excellent in the interlaminar strength between the layer of the fifth adhesive ethylene copolymer resin composition of the invention and the layer of a material of high polarity such as polyamide (nylon), an ethylene/vinyl alcohol copolymer or polyester or the layer of a metal.

EXAMPLE

The present invention will be further described with reference to the following examples, but it should be construed that the invention is in no way limited to those examples.

Preparation Example 1

In a 200-liter continuous reaction apparatus, copolymerization of ethylene and 1-octene was carried out under the conditions of a residence time of 1 hour, a polymerization temperature of 80° C. and a polymerization pressure of 5.6 kg/cm$^2$-G. In this reaction, hexane, 1-octene, ethylene and hydrogen were fed at feed rates of 95.5 l/hr, 4.5 l/hr, 3.4 l/hr and 10 Nl/hr, respectively.

As catalyst components, rac-dimethylsilylene-bis{1-(2-methyl-4-phenylindenyl)}zirconium dichloride (catalyst component (a)), methylaluminoxane (catalyst component (b)) and triisobutylaluminum (catalyst component (d)) were used The catalyst component (a) and the catalyst component (b) are previously contacted with each other. To the polymerization system, the catalyst component (a) was fed at a feed rate of 0.024 mmol/hr in terms of zirconium, the catalyst component (b) was fed at a feed rate of 7.2 mmol/hr in terms of aluminum, and the catalyst component (d) was fed at a feed rate of 10 mmol/hr in terms of aluminum.

As a result of the polymerization reaction, a polymer, i.e., an ethylene/1-octene copolymer (sometimes abbreviated to "PEO" hereinafter), was obtained at a rate of 5.0 kg/hr.

The ethylene/1-octene copolymer (PEO) had an ethylene content of 85.2% by weight, a density of 0.870 g/cm$^3$, MFR of 5.8 g/10 min, MT of 0.76 g, MFR$_{10}$/MFR$_2$ of 8.2, a B value of 1.00 and a crystallinity of 0%. The number of unsaturated bonds present in molecule was not more than 1 per one molecule of the copolymer.

Modification Example 1

The ethylene/1-octene copolymer (PEO) of 825 g obtained in Preparation Example 1 was dissolved in 5.7 liters of toluene (reaction solvent) at 160° C.

To the resulting toluene solution, a toluene solution of maleic anhydride (4.13 g/250 ml) and a toluene solution of dicumyl peroxide (DCP) (0.33 g/50 ml) were slowly fed through separate feed pipes over a period of 4 hours.

After the feeding, the reaction was continued at 160° C. for 30 minutes. Then, the system was cooled to room temperature to precipitate a polymer. The precipitated polymer was filtered, then repeatedly washed with acetone and vacuum dried at 80° C. for 1 day, to obtain the aimed modified ethylene/1-octene copolymer (sometimes abbreviated to "MAH-PEO" hereinafter).

The modified ethylene/1-octene copolymer (MAH-PEO) was subjected to elemental analysis to measure the graft quantity of the maleic anhydride. As a result, it was found that the graft quantity of the maleic anhydride was 2.0 g based on 100 g of the modified ethylene/1-octene copolymer. The modified ethylene/1-octene copolymer had a density of 0.873 g/cm$^3$ and MFR of 0.5 g/10 min.

Example A1

In a tumbler, 85 parts by weight of PEO obtained in Preparation Example 1, 5 parts by weight of MAH-PEO obtained in Modification Example 1 and 10 parts by weight of an alicyclic hydrogenated petroleum resin (tackifier, trade name: Arcon P125, available from Arakawa Kagaku K.K.) having a softening point of 125° C. were mixed. The resulting mixture was kneaded and granulated by a single-screw extruder (Dulmage screw) 40 mm in diameter preset at 200° C., to obtain an adhesive resin composition (I-1).

The adhesive resin composition (I-1) had a density of 0.880 g/cm$^3$, MFR of 5.0 g/10 min, a crystallinity (measured by X-ray diffractometry) of 0% and a graft quantity of 0.11% by weight based on the whole composition.

Then, the adhesive resin composition (I-1), an ethylene/vinyl acetate copolymer saponified resin (EVOH, trade name: Eval EP-F101A, available from Kuraray Co., Ltd., ethylene content: 32% by mol) and a polystyrene resin (HIPS, trade name: Torpolex 830-05, available from Mitsui Toatsu Chemicals, Inc.) were molded into a five-layer co-extruded sheet under the following conditions.

Molding Conditions

Sheet structure and thickness of each layer:

HIPS/(I-1)/EVOH/(I-1)/HIPS=350/50/50/50/350 ($\mu$m)
Extruder:

die diameter of 40 mm: molding temperature of 220° C. (for HIPS)

die diameter of 40 mm: molding temperature of 220° C. (for (I-1))

die diameter of 30 mm: molding temperature of 220° C. (for EVOH)

die diameter of 40 mm: molding temperature of 220° C. (for (I-1))

die diameter of 40 mm: molding temperature of 220° C. (for HIPS)

Die temperature: 220° C
Molding speed: 1 m/min

The five-layer co-extruded sheet obtained above was measured on the interlaminar strength between the HIPS layer and the adhesive resin composition (I-1) layer and the interlaminar strength between the EVOH layer and the adhesive resin composition (I-1) layer at peel testing temperatures of 23° C. and 60° C.

The measurement of the interlaminar strength was carried out in the following manner in accordance with a T-peel test. The five-layer sheet was cut to give a specimen having a width of 15 mm. One extremity of a layer of the specimen was peeled, and the peel strength was measured at a peel rate of 300 mm/min by means of an Instron tensile tester.

The results are set forth in Table 1.

Modification Example 2

In a Henschel mixer, 100 parts by weight of an ethylene/1-butene copolymer (sometimes abbreviated to "PEB(a)" hereinafter, ethylene content: 92% by weight, density: 0.920 g/cm³, MFR: 2.2 g/10 min) prepared by the use of a catalyst formed from a magnesium chloride-support type titanium catalyst and triethylaluminum, 0.9 part by weight of maleic anhydride and 0.08 part by weight of peroxide (trade name: Perhexyne-25B, available from Nippon Oils & Fats, Ltd.) were mixed.

The resulting mixture was melted and graft modified by a single-screw extruder preset at 230° C., to obtain a modified ethylene/1-butene copolymer (sometimes abbreviated to "MAH-PEB(a)" hereinafter).

The modified ethylene/1-butene copolymer (MAH-PEB (a)) was measured on the graft quantity of the maleic anhydride. As a result, it was found that the graft quantity of the maleic anhydride was 0.8 g based on 100 g of the modified ethylene/1-butene copolymer. The modified ethylene/1-butene copolymer (MAH-PEB(a)) had a density of 0.922 g/cm³, MFR of 0.3 g/10 min and a crystallinity (measured by X-ray diffractometry) of 40%.

Example A2

In a tumbler, 75 parts by weight of PEO obtained in Preparation Example 1, 15 parts by weight of MAH-PEB(a) obtained in Modification Example 2 and 10 parts by weight of an alicyclic hydrogenated petroleum resin (tackifier, trade name: Arcon P125, available from Arakawa Kagaku K.K.) having a softening point of 125° C. were mixed. The resulting mixture was kneaded and granulated by a single-screw extruder (Dulmage screw) 40 mm in diameter preset at 200° C., to obtain an adhesive resin composition (I-2).

The adhesive resin composition (I-2) had a density of 0.889 g/cm³, MFR of 3.5 g/10 min, a crystallinity (measured by X-ray diffractometry) of 10% and a graft quantity of 0.12% by weight based on the whole composition.

Then, a five-layer co-extruded sheet was produced in the same manner as in Example Al, except that the adhesive resin composition (I-2) was used in place of the adhesive resin composition (I-1).

The five-layer co-extruded sheet obtained above was measured on the interlaminar strength between the HIPS layer and the adhesive resin composition (I-2) layer and the interlaminar strength between the EVOH layer and the adhesive resin composition (I-2) layer at peel testing temperatures of 23° C. and 60° C.

The results are set forth in Table 1.

Comparative Example A1

An adhesive resin composition (I-3) was obtained in the same manner as in Example A2, except that an ethylene/1-butene copolymer (PEB(b)) prepared by the use of a conventional vanadium type Ziegler catalyst was used in place of the ethylene/1-octene copolymer (PEO).

The adhesive resin composition (I-3) had a density of 0.889 g/cm³, MFR of 2.7 g/10 min, a crystallinity (measured by X-ray diffractometry) of 10% and a graft quantity of 0.12% by weight based on the whole composition.

The ethylene/1-butene copolymer (PEB(b)) had, as shown in Table 2, an ethylene content of 85.3% by weight, a density of 0.870 g/cm³, MFR of 5.0 g/10 min, MT of 0.18 g, MFR₁₀/MFR₂ of 5.6, a B value of 1.02 and a crystallinity of 0%. The number of unsaturated bonds present in molecule was not more than 1 per one molecule of the copolymer.

Then, a five-layer co-extruded sheet was produced in the same manner as in Example A2, except that the adhesive resin composition (I-3) was used in place of the adhesive resin composition (I-2).

The five-layer co-extruded sheet obtained above was measured on the interlaminar strength between the HIPS layer and the adhesive resin composition (I-3) layer and the interlaminar strength between the EVOH layer and the adhesive resin composition (I-3) layer at peel testing temperatures of 23° C. and 60° C.

The results are set forth in Table 1.

TABLE 1

| | Adhesive resin composition | Interlaminar strength [g/15 mm] | | | |
|---|---|---|---|---|---|
| | | HIPS/ (I-1), (I-2) or (I-3) | | EVOH/ (I-1), (I-2) or (I-3) | |
| | | 23° C. | 60° C. | 23° C. | 60° C. |
| Ex. A1 | (I-1) | 620 | 100 | unpeelable | unpeelable |
| Ex. A2 | (I-2) | 600 | 110 | unpeelable | unpeelable |
| Comp. Ex. A1 | (I-3) | 580 | 30 | unpeelable | unpeelable |

TABLE 2

| Comonomer | PEO 1-octene | PEB (b) 1-butene |
|---|---|---|
| Comonomer content (wt %) | 14.8 | 14.7 |
| Ethylene content (wt %) | 85.2 | 85.3 |
| Density (g/cm³) | 0.870 | 0.870 |
| MFR (g/10 min) | 5.8 | 5.0 |
| MT (g) | 0.76 | 0.18 |
| Crystallinity (%) | 0 | 0 |
| B value | 1.00 | 1.02 |
| MFR₁₀/MFR₂ | 8.2 | 5.6 |
| Number of unsaturated bonds per molecule of copolymer | not more than 1 | not more than 1 |

Catalyst used in the preparation of PEB(b): vanadium type ziegler catalyst.

Example B1

In a tumbler, 75 parts by weight of PEO obtained in Preparation Example 1, 5 parts by weight of MAH-PEO obtained in Modification Example 1 and 20 parts by weight of an ethylene/vinyl acetate copolymer (trade name: Evaflex P-2505, available from Mitsui Dupont Polychemical K.K., vinyl acetate content: 25% by weight, MFR: 2.5 g/10 min) were mixed. The resulting mixture was kneaded and granulated by a single-screw extruder (Dulmage screw) 40 mm in diameter preset at 200° C., to obtain an adhesive resin composition (II-1).

The adhesive resin composition (II-1) had a density of 0.888 g/cm³, MFR of 3.0 g/10 min, a crystallinity (measured by X-ray diffractometry) of 0% and a graft quantity of 0.11% by weight based on the whole composition.

Then, the adhesive resin composition (II-1), an ethylene/vinyl acetate copolymer saponified resin (EVOH, trade name: Eval EP-F101A, available from Kuraray Co., Ltd., ethylene content: 32% by mol) and a polyethylene terephthalate resin (PET, trade name: J125, available from Mitsui PET K.K.) were molded into a three-layer co-extruded film under the following conditions.

Molding Conditions

Sheet structure and thickness of each layer:
PET/(II-1)/EVOH=80/30/40 (μm)
Extruder:
die diameter of 40 mm: molding temperature of 270° C. (for PET)
die diameter of 40 mm: molding temperature of 240° C. (for (II-1))
die diameter of 40 mm: molding temperature of 221° C. (for EVOH)
Die temperature: 270° C.
Molding speed: 5 m/min The three-layer co-extruded film obtained above was measured on the interlaminar strength between the PET layer and the adhesive resin composition (II-1) layer and the interlaminar strength between the EVOH layer and the adhesive resin composition (II-1) layer at peel testing temperatures of 23° C. and 60° C.

The measurement of the interlaminar strength was carried out in the following manner in accordance with a T-peel test. The three-layer film was cut to give a specimen having a width of 15 mm. One extremity of a layer of the specimen was peeled, and the peel strength was measured at a peel rate of 300 mm/min by means of an Instron tensile tester.

The results are set forth in Table 3.

Example B2

The adhesive resin composition (II-1) used in Example B1, an ethylene/vinyl acetate copolymer saponified resin (EVOH, trade name: Eval EP-F101A, available from Kuraray Co., Ltd., ethylene content: 32% by mol) and a polycarbonate resin (PC, trade name: Teijin Panlite L-1250, available from Teijin Kasei K.K.) were molded into a three-layer co-extruded film under the following conditions.

Molding Conditions

Sheet structure and thickness of each layer:
PC/(II-1)/EVOH=80/30/40 (μm)
Extruder:
die diameter of 40 mm: molding temperature of 270° C. (for PC)
die diameter of 40 mm: molding temperature of 240° C. (for (II-1))
die diameter of 40 mm: molding temperature of 220° C. (for EVOH)
Die temperature: 270° C.
Molding speed: 5 m/min The three-layer co-extruded film obtained above was measured on the interlaminar strength between the PC layer and the adhesive resin composition (II-1) layer and the interlaminar strength between the EVOH layer and the adhesive resin composition (II-1) layer at peel testing temperatures of 23° C. and 60° C.

The results are set forth in Table 3.

Example B3

The adhesive resin composition (II-1) used in Example B1, an ethylene/vinyl acetate copolymer saponified resin (EVOH, trade name: Eval EP-F101A, available from Kuraray Co., Ltd., ethylene content: 32% by mol) and a polyvinylidene chloride resin (PVDC, trade name: SARAN X-05253-16, available from The Dow Chemical Co.) were molded into a three-layer co-extruded film under the following conditions.

Molding Conditions

Sheet structure and thickness of each layer:
PVDC/(II-1)/EVOH=40/30/80 (μm)
Extruder:
die diameter of 40 mm: molding temperature of 200° C. (for PVDC)
die diameter of 40 mm: molding temperature of 240° C. (for (II-1))
die diameter of 40 mm: molding temperature of 220° C. (for EVOH)
Die temperature: 220° C
Molding speed: 5 m/min The three-layer co-extruded film obtained above was measured on the interlaminar strength between the PVDC layer and the adhesive resin composition (II-1) layer and the interlaminar strength between the EVOH layer and the adhesive resin composition (II-1) layer at peel testing temperatures of 23° C. and 60° C.

The results are set forth in Table 3.

Example B4

In a tumbler, 65 parts by weight of PEO obtained in Preparation Example 1, 15 parts by weight of MAH-PEB(a) obtained in Modification Example 2 and 20 parts by weight of an ethylene/vinyl acetate copolymer (trade name: Evaflex P-2505, available from Mitsui Dupont Polychemical K.K., vinyl acetate content: 25% by weight, MFR: 2.5 g/10 min) were mixed. The resulting mixture was kneaded and granulated by a single-screw extruder (Dulmage screw) 40 mm in diameter preset at 200° C., to obtain an adhesive resin composition (II-2).

The adhesive resin composition (II-2) had a density of 0.896 g/cm$^3$, MFR of 2.6 g/10 min, a crystallinity (measured by X-ray diffractometry) of 10% and a graft quantity of 0.12% by weight based on the whole composition.

Then, a three-layer co-extruded film was produced in the same manner as in Example B1, except that the adhesive resin composition (II-2) was used in place of the adhesive resin composition (II-1).

The three-layer co-extruded film obtained above was measured on the interlaminar strength between the PET layer and the adhesive resin composition (II-2) layer and the interlaminar strength between the EVOH layer and the adhesive resin composition (II-2) layer at peel testing temperatures of 23° C. and 60° C.

The results are set forth in Table 3.

Comparative Example B1

An adhesive resin composition (II-3) was obtained in the same manner as in Example B4, except that an ethylene/1-butene copolymer (PEB(b)) prepared by the use of a conventional vanadium type Ziegler catalyst was used in place of the ethylene/1-octene copolymer (PEO).

The adhesive resin composition (II-3) had a density of 0.897 g/cm$^3$, MFR of 2.8 g/10 min, a crystallinity (measured by X-ray diffractometry) of 10% and a graft quantity of 0.12% by weight based on the whole composition.

Then, a three-layer co-extruded film was produced in the same manner as in Example B4, except that the adhesive resin composition (II-3) was used in place of the adhesive resin composition (II-2).

The three-layer co-extruded film obtained above was measured on the interlaminar strength between the PET layer and the adhesive resin composition (II-3) layer and the interlaminar strength between the EVOH layer and the adhesive resin composition (II-3) layer at peel testing temperatures of 23° C. and 60° C.

The results are set forth in Table 3.

TABLE 3

| | | | Interlaminar strength [g/15 mm] | | | |
|---|---|---|---|---|---|---|
| Adhesive resin composition | Adherend (H1) | Adherend (H2) | H1/(II-1), (II-2) or (II-3) | | H2/(II-1), (II-2) or (II-3) | |
| | | | 23° C. | 60° C. | 23° C. | 60° C. |
| Ex. B1 | (II-1) | PET | EVOH | 1300 | 130 | unpeelable | unpeelable |
| Ex. B2 | (II-1) | PC | EVOH | 1400 | 100 | unpeelable | unpeelable |
| Ex. B3 | (II-1) | PVDC | EVOH | 1100 | 100 | unpeelable | unpeelable |
| Ex. B4 | (II-2) | PET | EVOH | 1400 | 120 | unpeelable | unpeelable |
| Comp. Ex. B1 | (II-3) | PET | EVOH | 1100 | 30 | unpeelable | unpeelable |

Preparation Example 2

Preparation of Graft-Modified Ethylene/1-Hexene Copolymer

Preparation of Catalyst Component

Silica of 5.0 kg having been dried at 250° C. for 10 hours was suspended in 80 liters of toluene, and the resulting suspension was cooled to 0° C. To the suspension was dropwise added 28.7 liters of a toluene solution of methylaluminoxane (Al: 1.33 mol/l) over a period of 1 hour. During the addition, the temperature of the system was maintained at 0° C. Subsequently, the reaction was continued-at 0° C. for 30 minutes. Then, the temperature of the system was raised to 95° C. over a period of 1.5 hours, and the reaction was conducted at this temperature for 20 hours. Then, the system was cooled to 60° C., and the supernatant liquid was removed by decantation.

The resulting solid was washed twice with toluene and resuspended in 80 liters of toluene. To the system, 6.6 liters of a toluene solution of bis(1,3-n-butylmethylcyclopentadienyl)zirconium dichloride (Zr: 34.0 mmol/l) and 2.0 liters of a toluene solution of bis(1,3-dimethylcyclopentadienyl)zirconium dichloride (Zr: 28.1 mmol/l) were dropwise added over a period of 30 minutes, and the reaction was further conducted at 80° C. for 2 hours. Then, the supernatant liquid was removed, and the remainder was washed twice with hexane, to obtain a solid catalyst containing 3.6 mg of zirconium based on 1 g of the catalyst.

Preparation of Prepolymerized Catalyst

To 85 liters of hexane containing 1.7 mol of triisobutylaluminum were added 0.85 kg of the solid catalyst-obtained above and 255 g of 1-hexene, and prepolymerization of ethylene was performed at 35° C. for 12 hours. Thus, a prepolymerized catalyst in which 10 g of polyethylene (prepolymer) was produced per 1 g of the solid catalyst was obtained. This ethylene polymer had an intrinsic viscosity [η] of 1.74 dl/g.

Polymerization

In a continuous type fluidized bed gas phase polymerization reactor, copolymerization of ethylene and 1-hexene was carried out at a polymerization temperature of 80° C. under a total pressure of 20 kg/cm$^2$-G. To the system, the prepolymerized catalyst obtained above and triisobutylaluminum were continuously fed at feed rates of 0.18 mmol/hr (in terms of zirconium atom) and 10 mmol/hr, respectively. Further, ethylene, 1-hexene, hydrogen and nitrogen were continuously fed to keep the gas composition constant during the polymerization (gas composition: 1-hexene/ethylene=0.030, hydrogen/ethylene=5.5×10$^{-4}$, ethylene concentration=25%).

Thus, an ethylene/1-hexene copolymer (EH-1) was obtained in an yield of 6.0 kg/hr. The ethylene/1-hexene copolymer (EH-1) had a density of 0.923 g/cm$^3$, MFR of 2.1 g/10 min, a melting point (Tm, temperature at maximum peak, by DSC) of 114.5° C., a melt tension (MT) of 2.1 g and a quantity of decane-soluble portion (W) at 23° C. of 0.26% by weight. The number of the unsaturated bonds was 0.09 per 1,000 carbon atoms, and it was 0.16 per one molecule of the polymer. The B value indicating distribution of 1-hexene in the copolymer chains was 1.02.

Graft Modification

The ethylene/1-hexene copolymer (EH-1) of 825 g was dissolved in 5.7 liters of toluene (reaction solvent) at 160° C.

To the resulting solution, a toluene solution of maleic anhydride (4.13 g/250 ml) and a toluene solution of dicumyl peroxide (DPC) (0.33 g/50 ml) were slowly fed through separate feed pipes over a period of 4 hours.

After the feeding, the reaction was continued at 160° C. for 30 minutes. Then, the temperature of the system was cooled to room temperature to precipitate a polymer. The precipitated polymer was filtered, then repeatedly washed with acetone and vacuum dried at 80° C. for 1 day, to obtain the aimed graft-modified ethylene/1-hexene copolymer (MAH-EH-1).

The modified ethylene/1-hexene copolymer (MAH-EH-1) was subjected to elemental analysis to measure the graft quantity of the maleic anhydride. As a result, it was found that the graft quantity of the maleic anhydride was 0.2 g based on 100 g of the modified ethylene/1-hexene copolymer. The modified ethylene/1-hexene copolymer had a density of 0.923 g/cm$^3$ and MFR of 1.0 g/10 min.

Example C1

Preparation of Composition

90 Parts by weight of the modified ethylene/1-hexene copolymer (MAH-EH-1) obtained in Preparation Example 2 and 10 parts by weight of an ethylene/propylene copolymer (EPR, density: 0.865 g/cm$^3$, MFR: 0.5 g/10 min, crystallinity: 4%, amount of constituent units derived from ethylene: 80% by mol) were melt blended to obtain a modified ethylene copolymer resin composition.

Then, the adhesive strength of the composition to low-density polyethylene (LDPE) and the adhesive strength thereof to an ethylene/vinyl alcohol copolymer were measured in the following manner.

Evaluation of Adhesive Strength to Ethylene/Vinyl Alcohol Copolymer and Adhesive Strength to Low-Density Polyethylene An ethylene/vinyl alcohol copolymer (EVOH, trade name: Eval EP-F, available from Kuraray Co., Ltd., MFR (ASTM D 1238,E): 1.3 g/10 min, density: 1.19 g/cm$^3$, ethylene content: 32% by mol, saponification degree: 100%), the modified ethylene copolymer resin composition obtained above and low-density polyethylene (LDPE) were molded into a three-layer co-extrusion cast film under the following conditions.

Molding Conditions

Film structure and thickness of each layer:
EVOH (outside layer)/composition (intermediate layer)/LDPE (inside layer)=20/10/40 (μm)
Molding machine:
Extruder with die 40 mm in diameter (for outside layer): preset at 220° C.
Extruder with die 30 mm in diameter (for intermediate layer): preset at 220° C.
Extruder with die 40 mm in diameter (for inside layer): preset at 220° C.
Molding speed: 20 mm/min The three-layer film was cut to give a specimen having a width of 15 mm. One extremity of a layer of the specimen was peeled, and the interlaminar strength (peel strength, $F_{EVOH}$ (g/15 mm)) between the EVOH layer and the composition layer and the interlaminar strength (peel strength, $F_{LDPE}$ (g/15 mm)) between the LDPE layer and the composition layer were measured by an Instron tensile tester at a peel rate of 300 mm/min in accordance with a T-peel test.

The results are set forth in Table 4.

Example C2

A modified ethylene copolymer resin composition was obtained in the same manner as in Example C1, except that the amount of the modified ethylene/1-hexene copolymer (MAH-EH-1) and the amount of the ethylene/propylene copolymer (EPR) were varied to 80 parts by weight and 20 parts by weight, respectively.

Then, the adhesive strength of the composition to the low-density polyethylene (LDPE) and the adhesive strength thereof to the ethylene/vinyl alcohol copolymer were measured in the same manner as in Example C1.

The results are set forth in Table 4.

Example C3

A modified ethylene copolymer resin composition was obtained in the same manner as in Example C1, except that the amount of the modified ethylene/1-hexene copolymer (MAH-EH-1) and the amount of the ethylene/propylene copolymer (EPR) were varied to 70 parts by weight and 30 parts by weight, respectively.

Then, the adhesive strength of the composition to the low-density polyethylene (LDPE) and the adhesive strength thereof to the ethylene/vinyl alcohol copolymer were measured in the same manner as in Example C1.

The results are set forth in Table 4.

Preparation Example 3

Preparation of Graft-Modified Ethylene/1-Hexene Copolymer

100 Parts by weight of the ethylene/1-hexene copolymer (EH-1) of Preparation Example 2, 0.9 part by weight of maleic anhydride and 0.08 part by weight of peroxide (trade name: Perhexyne-25B, available from Nippon Oils & Fats., Ltd.) were mixed. The resulting mixture was melted and graft modified by a single-screw extruder preset at 230° C., to obtain a modified ethylene/1-hexene copolymer (MAH-EH-2).

The modified ethylene/1-hexene copolymer (MAH-EH-2) was subjected to elemental analysis to measure the graft quantity of the maleic anhydride. As a result, it was found that the graft quantity of the maleic anhydride was 1.0 g based on 100 g of the modified ethylene/1-hexene copolymer. The modified ethylene/1-hexene copolymer had a density of 0.926 g/cm$^3$ and MFR of 0.2 g/10 min.

Example C4

15 Parts by weight of the modified ethylene/1-hexene copolymer (MAH-EH-2) obtained in Preparation Example 3, 65 parts by weight of the unmodified ethylene/1-hexene copolymer (EH-1) obtained in Preparation Example 2 and 20 parts by weight of the ethylene/propylene copolymer (EPR) used in Example C1 were melt blended to obtain a modified ethylene copolymer resin composition.

Then, the adhesive strength of the composition to the low-density polyethylene (LDPE) and the adhesive strength thereof to the ethylene/vinyl alcohol copolymer were measured in the same manner as in Example C1.

The results are set forth in Table 4.

Example C5

A modified ethylene copolymer resin composition was obtained in the same manner as in Example C4, except that an ethylene/1-octene copolymer (EOR, density: 0.870 g/cm$^3$, MFR: 5.8 g/10 min, crystallinity: 0%, amount of constituent units derived from ethylene: 85.2% by mol) was used in place of the EPR.

Then, the adhesive strength of the composition to the low-density polyethylene (LDPE) and the adhesive strength thereof to the ethylene/vinyl alcohol copolymer were measured in the same manner as in Example C1.

The results are set forth in Table 4.

Example C6

A modified ethylene copolymer resin composition was obtained in the same manner as in Example C4, except that an ethylene/1-butene copolymer (EBR, density: 0.885 g/cm$^3$, MFR: 6.0 g/10 min, crystallinity: 16%, amount of constituent units derived from ethylene: 90% by mol) was used in place of the EPR.

Then, the adhesive strength of the composition to the low-density polyethylene (LDPE) and the adhesive strength thereof to the ethylene/vinyl alcohol copolymer were measured in the same manner as in Example C1.

The results are set forth in Table 4.

Comparative Example C1

The procedure of Example C1 was repeated, except that the modified ethylene/1-hexene copolymer (MAH-EH-1) was used singly in place of the modified ethylene copolymer resin composition.

The results are set forth in Table 4.

Comparative Example C2

The procedure of Example C4 was repeated, except that 85 parts by weight of low-density polyethylene (Ti-PE, density: 0.921 g/cm³, MFR: 2.1 g/10 min) prepared by the use of a conventional Ti catalyst was used in place of 65 parts by weight of the unmodified ethylene/1-hexene copolymer (EH-1) and the ethylene/propylene copolymer (EPR) was not used.

The results are set forth in Table 4.

TABLE 4

|  | Example | | | |
| --- | --- | --- | --- | --- |
|  | C1 | C2 | C3 | C4 |
| Composition (part(s) by weight) | | | | |
| Modified ethylene/α-olefin copolymer | | | | |
| MAH-EH-1 | 90 | 80 | 70 | — |
| MAH-EH-2 | — | — | — | 15 |
| Olefin elastomer | | | | |
| EPR | 10 | 20 | 30 | 20 |
| EOR | — | — | — | — |
| EBR | — | — | — | — |
| Unmodified ethylene/α-olefin copolymer | | | | |
| Me-PE | — | — | — | 65 |
| Ti-PE | — | — | — | — |
| Properties of blend | | | | |
| Density (g/cm3) | 0.918 | 0.910 | 0.903 | 0.911 |
| MFR (g/10 min) | 0.9 | 0.85 | 0.8 | 1.1 |
| Graft quantity (wt %) | 0.18 | 0.16 | 0.14 | 0.15 |
| Crystallinity (%) | 45 | 40 | 35 | 40 |
| Interlaminar strength of laminate | | | | |
| $F_{EVOH}$ (g/15 mm) | 200 | 420 | 530 | 390 |
| $F_{LDPE}$ (g/15 mm) | unpeelable | unpeelable | unpeelable | unpeelable |

Remarks:
Me-PE: unmodified ethylene/1-hexene copolymer (EH-1) prepared by the use of metallocene catalyst
Ti-PE: low-density polyethylene prepared by the use of conventional titanium catalyst

TABLE 4

|  | Example | | Comparative Example | |
| --- | --- | --- | --- | --- |
|  | C5 | C6 | C1 | C2 |
| Composition (part(s) by weight) | | | | |
| Modified ethylene/α-olefin copolymer | | | | |
| MAH-EH-1 | — | — | 100 | — |
| MAH-EH-2 | 15 | 15 | — | 15 |

TABLE 4-continued

|  | Example | | Comparative Example | |
| --- | --- | --- | --- | --- |
|  | C5 | C6 | C1 | C2 |
| Olefin elastomer | | | | |
| EPR | — | — | — | — |
| EOR | 20 | — | — | — |
| EBR | — | 20 | — | — |
| Unmodified ethylene/α-olefin copolymer | | | | |
| Me-PE | 65 | 65 | — | — |
| Ti-PE | — | — | — | 85 |
| Properties of blend | | | | |
| Density (g/cm3) | 0.914 | 0.915 | 0.923 | 0.924 |
| MFR (g/10 min) | 1.7 | 1.7 | 1.0 | 1.3 |
| Graft quantity (wt %) | 0.15 | 0.15 | 0.20 | 0.15 |
| Crystallinity (%) | 42 | 42 | 49 | 50 |
| Interlaminar strength of laminate | | | | |
| $F_{EVOH}$ (g/15 mm) | 330 | 280 | 50 | 40 |
| $F_{LDPE}$ (g/15 mm) | unpeelable | unpeelable | unpeelable | unpeelable |

Remarks:
Me-PE: unmodified ethylene/1-hexene copolymer (EH-1) prepared by the use of metallocene catalyst
Ti-PE: low-density polyethylene prepared by the use of conventional titanium catalyst

What is claimed is:

1. An adhesive ethylene copolymer resin composition comprising a blend of:

50 to 95% by weight of a modified ethylene/α-olefin copolymer (E2) obtained by graft-modifying an unmodified linear ethylene/α-olefin copolymer (E1) comprising ethylene and an α-olefin of 3 to 20 carbon atoms with an unsaturated carboxylic acid or its derivative, or 50 to 95% by weight of the unmodified ethylene/α-olefin copolymer (E1) and the modified ethylene/α-olefin copolymer (E2), said linear ethylene/α-olefin copolymer (E1) being prepared by the use of an olefin polymerization catalyst comprising a Group IV transition metal compound (a) containing a ligand having cyclopentadienyl skeleton and an organoaluminum oxy-compound (b), and 5 to 50% by weight of an olefin elastomer (F);

wherein the unmodified ethylene/α-olefin copolymer (E1) is a linear ethylene/α-olefin copolymer having the following properties:

the density (d) is in the range of 0.900 to 0.965 g/cm³, the melt flow rate (MFR) at 190° C. under a load of 2.16 kg is in the range of 0.01 to 200 g/10 min, the temperature (Tm) in °C. at the position of the maximum peak of an endotherm curve of the copolymer measured by a differential scanning calorimeter (DSC) and the density (d) satisfy the relation $Tm < 400 \times d - 250$, the melt tension (MT) in grams and the melt flow rate (MFR) at 190° C. satisfy the relation $MT \leq 2.2 \times MFR^{-0.84}$, and the quantity fraction (W) in % by weight of a decane-soluble component of the copolymer at 23° C. and the density (d) satisfy the relation in the case of MFR≦10 g/10 min:

$$W < 80 \times \exp(-100(d-0.88)) + 0.1, \text{ and}$$

in the case of MFR>10 g/10 min:

$$W < 80 \times (MFR-9)^{0.26} \times \exp(-100(d-0.88)) + 0.1; \text{ and}$$

the olefin elastomer (F) has the following properties:
the density (d) is in the range of 0.850 to 0.895 g/cm³,
the melt flow rate (MFR) at 190° C. under a load of 2.16 kg is in the range of 0.01 to 200 g/10 min, and
the crystallinity, as measured by X-ray diffractometry, is less than 30%.

2. The adhesive ethylene copolymer resin composition as claimed in claim 1, wherein the blend of the modified ethylene/α-olefin copolymer [E2] and the olefin elastomer [F] and the blend of the unmodified ethylene/α-olefin copolymer [E1], the modified ethylene/α-olefin copolymer [E2] and the olefin elastomer [F] have the following properties:

the density (d) is in the range of 0.870 to 0.960 g/cm³,
the melt flow rate (MFR) at 190° C. under a load of 2.16 kg is in the range of 0.01 to 100 g/10 min,
the graft quantity of the graft group derived from the unsaturated carboxylic acid or its derivative is in the range of 0.01 to 5% by weight, and
the crystallinity, as measured by X-ray diffractometry, is not less than 15%.

3. An adhesive ethylene copolymer resin composition as claimed in claim 1, wherein the olefin elastomer (F) is an ethylene/α-olefin copolymer containing constituent units derived from ethylene in amounts of 75 to 95% by mol.

4. A laminate comprising a layer of the adhesive ethylene copolymer resin composition as claimed in claim 1 and a layer of a polar material or a metal.

5. The laminate as claimed in claim 4, wherein the polar material comprises an ethylene/vinyl alcohol copolymer, polyamide or polyester.

* * * * *